United States Patent
Wu et al.

(10) Patent No.: US 12,050,896 B2
(45) Date of Patent: Jul. 30, 2024

(54) SYSTEM ARCHITECTURE SWITCHING METHOD AND APPARATUS

(71) Applicant: Huawei Technologies Co., Ltd., Guangdong (CN)

(72) Inventors: Yuming Wu, Shanghai (CN); Fangzhou Lu, Beijing (CN); Xie Miao, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/154,560

(22) Filed: Jan. 13, 2023

(65) Prior Publication Data
US 2023/0153088 A1    May 18, 2023

Related U.S. Application Data

(63) Continuation of application No. PCT/CN2021/097850, filed on Jun. 2, 2021.

(30) Foreign Application Priority Data

Jul. 16, 2020   (CN) .......................... 202010687260.6

(51) Int. Cl.
G06F 8/41    (2018.01)
(52) U.S. Cl.
CPC .................. *G06F 8/457* (2013.01)
(58) Field of Classification Search
None
See application file for complete search history.

(56) References Cited

U.S. PATENT DOCUMENTS

| | | | |
|---|---|---|---|
| 2015/0052616 A1* | 2/2015 | Hutchison | G06F 3/0632 726/27 |
| 2015/0193185 A1* | 7/2015 | Guo | G06F 3/1431 345/1.3 |

(Continued)

FOREIGN PATENT DOCUMENTS

| | | |
|---|---|---|
| CN | 101763265 A | 6/2010 |
| CN | 104598303 A | 5/2015 |

(Continued)

OTHER PUBLICATIONS

Ding ming, Research on Reconfiguration and Verification Methods for Integrated Modular Avionics , Jan. 2020, 37 pages (with an English translation).

(Continued)

*Primary Examiner* — Philip Wang
(74) *Attorney, Agent, or Firm* — WOMBLE BOND DICKINSON (US) LLP

(57) ABSTRACT

This application provides a system architecture switching method and apparatus. The method includes: when a system architecture needs to be switched, transforming a first system architecture into a second system architecture, where the first system architecture represents a system architecture before switching; and providing a service for a user by using the second system architecture. Dynamic switching of a system architecture is implemented by using a transformable system architecture, so that switching of different architectures can be implemented by using only one system architecture. Therefore, only code for implementing the system architecture is required, and code overheads can be reduced in comparison with a conventional technology.

14 Claims, 10 Drawing Sheets

(56) References Cited

U.S. PATENT DOCUMENTS

| | | | |
|---|---|---|---|
| 2020/0274898 A1* | 8/2020 | Xie | H04L 63/1458 |
| 2022/0171850 A1* | 6/2022 | Nagata | G05B 23/0291 |

FOREIGN PATENT DOCUMENTS

| | | | | |
|---|---|---|---|---|
| CN | 105022954 A | | 11/2015 | |
| CN | 108182263 A | * | 6/2018 | G06F 16/2219 |
| EP | 1505497 A1 | | 2/2005 | |
| EP | 4184338 A1 | * | 5/2023 | G06F 8/457 |

OTHER PUBLICATIONS

YaoZu Dong, Wei Ye, YunHong Jiang, Ian Pratt, ShiQing Ma, Jian Li, and HaiBing Guan. 2013. COLO: COarse-grained LOck-stepping virtual machines for non-stop service. In Proceedings of the 4th annual Symposium on Cloud Computing (SOCC "13). Association for Computing Machinery, New York, NY, USA, Article 3, 1 16. https://doi.org/10.1145/2523616.2523630.

Lee Hojoon Hojoon Lee@Cispa Saarland et al: "Lord of thex86 Rings A Portable User Mode Privilege Separation Architecture on x86", Proceedings of The 2018 IEEE/ACM InternationalConference On Connected Health:Applications, Systemsand Engineering Technologies, ACMPUB27, New York, NY,USA, Oct. 15, 2018 (Oct. 15, 2018), pp. 1441-1454, XP058701332.

Anonymous:architecturePage IJun. 15, 2015XP09311103 5 Privilege Levelinstructions—in X86Zack s Ad hoc (Jun. 15, 2015) pp. 1-5.

* cited by examiner

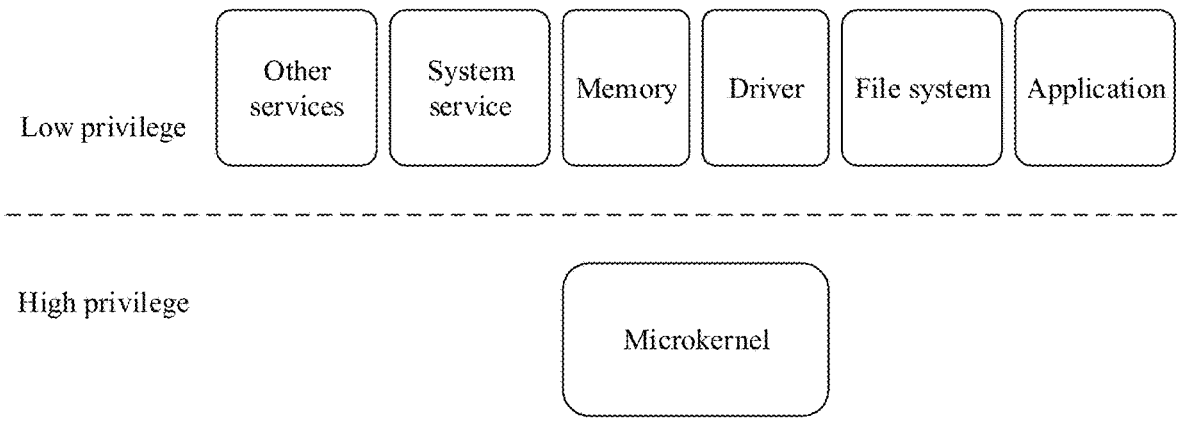
FIG. 1
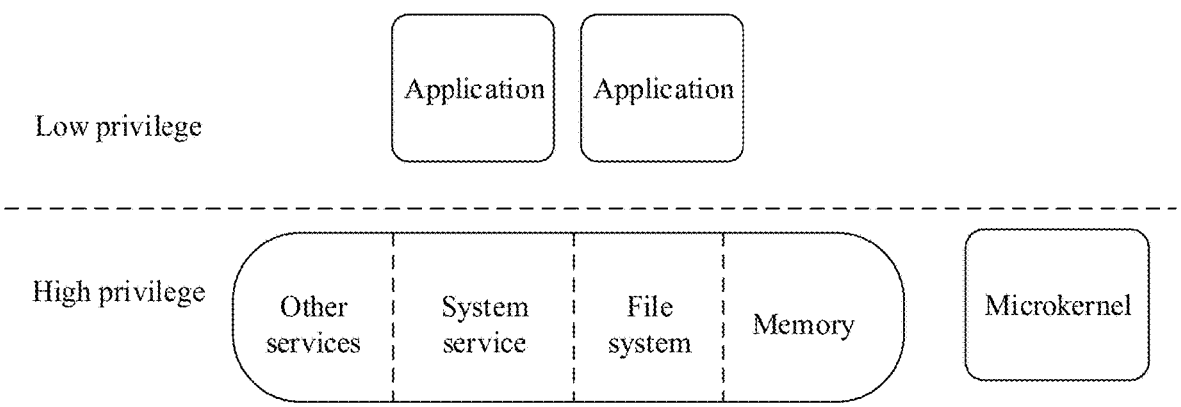
FIG. 2
S310. Transform a first system architecture into a second system architecture
S320. Provide a service for a user by using the second system architecture
FIG. 3

SYSTEM ARCHITECTURE SWITCHING METHOD AND APPARATUS

CROSS-REFERENCE TO RELATED APPLICATIONS

This application is a continuation of International Application No. PCT/CN2021/097850, filed on Jun. 2, 2021, which claims priority to Chinese Patent Application No. 202010687260.6, filed on Jul. 16, 2020. The disclosures of the aforementioned applications are hereby incorporated by reference in their entirety.

TECHNICAL FIELD

This application relates to the field of computer technologies, and in particular, to a system architecture switching method and apparatus.

BACKGROUND

Different application scenarios have different requirements on security and communication performance of a computer system. For example, in a scenario in which the system interacts with a user, an abnormal input or attack needs to be prevented, that is, the application scenario has a relatively high requirement on system security. In this case, the system architecture should be a high-security architecture. After the interaction between the system and the user is completed, a large amount of computation needs to be performed, that is, the application scenario has a high requirement on communication efficiency. In this case, the system architecture should be a high-performance architecture. Therefore, different system architectures need to be designed to meet different application requirements.

A solution provided in a conventional technology is to design a plurality of system architectures in a computer system and enable a required system architecture based on an application scenario. However, to implement one more system architecture, twice as much code is needed, and code overheads are relatively high. This is unacceptable in a scenario with insufficient resources, such as the Internet of Things (IOT).

SUMMARY

This application provides a system architecture switching method and apparatus, to implement dynamic switching of a system architecture by using a transformable system architecture, so that switching of different architectures can be implemented by using only one system architecture. Therefore, only code for implementing the system architecture is required, and code overheads can be reduced in comparison with a conventional technology.

According to a first aspect, a system architecture switching method is provided. The method includes: transforming a first system architecture into a second system architecture, where the second system architecture represents a system architecture before switching, and the first system architecture represents a system architecture after switching; and providing a service for a user by using the second system architecture.

The first system architecture and the second system architecture may be transformed into each other. A relationship between the first system architecture and the second system architecture is any one or more of the following cases: a privilege level of a service process in the first system architecture is different from a privilege level of a service process in the second system architecture, and a quantity of service processes in the first system architecture is different from a quantity of service processes in the second system architecture.

It should be understood that dynamic switching of a system architecture is implemented by using a transformable system architecture, so that switching of different architectures can be implemented by using only one system architecture. Therefore, only code for implementing the system architecture is required, and code overheads can be reduced in comparison with a conventional technology.

In an embodiment, whether the system architecture needs to be switched may be determined based on a requirement of an application scenario on the system architecture. When the system architecture needs to be switched, the system architecture can be transformed, that is, dynamic switching of the system architecture is implemented. In this way, requirements of application scenarios on different system architectures can be dynamically met during system running.

The first system architecture may be transformed into the second system architecture in a plurality of manners.

In an embodiment, the first system architecture includes a first service process; and the transforming a first system architecture into a second system architecture includes: changing a privilege level of the first service process.

A privilege represents a capability to perform security-related functions on a computer. A process with the privilege to perform security-related functions is considered as running with a high privilege. A process without the privilege to perform security-related functions is considered as running with a low privilege. The high privilege and the low privilege are different privilege levels, and privileges at different levels are also different privilege levels.

The changing a privilege level of the first service process includes privilege escalation processing and privilege de-escalation processing. The privilege escalation processing means escalating the privilege level of the service process. The privilege de-escalation processing means de-escalating the privilege level of the service process.

In this embodiment, switching from the first system architecture to the second system architecture is implemented by changing the privilege level of the first service process. The privilege level of the first service process in the first system architecture is different from a privilege level of a first service process in the second system architecture.

It should be understood that dynamic switching of the system architecture is implemented by changing the privilege level of the service process.

In an embodiment, when addresses at different privilege levels are different, the first service process is created by using a mechanism in which a data segment supports address-independent relocation and a mechanism in which a code segment supports address-independent relocation.

The mechanism in which the code segment supports address-independent relocation means that running of the service process can be ensured regardless of whether an address of the code segment of the service process changes. In other words, the service process runs independently of the address of the code segment.

The mechanism in which the data segment supports address-independent relocation means that running of the service process can be ensured regardless of whether an address of the data segment of the service process changes. In other words, the service process runs independently of the address of the data segment.

In an embodiment, the privilege level of the first service process includes a first privilege level and a second privilege level, where the first privilege level uses a low address, and the second privilege level uses a high address; and the mechanism in which the data segment supports address-independent relocation includes: always mapping the data segment of the first service process to the low address.

In an embodiment, one of the first privilege level and the second privilege level represents a low privilege, and the other represents a high privilege.

In an embodiment, both the first privilege level and the second privilege level are high privileges, and a privilege level of one of them is higher than a privilege level of the other.

The high address and low address are common concepts in the computer field. The high address is relative to the low address, that is, relative to a size of address code.

The operation of always mapping the data segment of the first service process to the low address includes: static configuration and dynamic maintenance. The static configuration means that before the first service process runs, the data segment of the first service process is mapped to the low address by using the static configuration. The dynamic maintenance means that when the privilege level of the first service process changes (that is, a data segment address change is caused) in the running process, the mapping of the data segment still to the low address is dynamically maintained.

In an embodiment, the mechanism in which the data segment supports address-independent relocation includes: performing address translation processing on the data segment of the first service process, so that the data segment of the first service process after the privilege level changes and the data segment of the first service process before the privilege level changes are mapped to a same address; and the mechanism in which the code segment supports address-independent relocation includes: performing address translation processing on the code segment of the first service process, so that the code segment of the first service process after the privilege level changes and the code segment of the first service process before the privilege level changes are mapped to a same address.

The address translation processing may be performed on the code segment and the data segment of the first service process by using hardware or software.

In the conventional technology, a manner of changing a privilege level of a process is: first destroying an old process, and then revalidating a new process. In other words, in the conventional technology, a privilege level of a service process cannot be changed during running of the service process.

In this application, because the service process is created by using the mechanism in which the data segment supports address-independent relocation and the mechanism in which the code segment supports address-independent relocation, the privilege level of the service process can be dynamically changed during running of the service process, and dynamic switching of the system architecture can be implemented by dynamically changing the privilege level of the service process.

In an embodiment in which dynamic switching of the system architecture is implemented by dynamically changing the privilege level of the service process, the system architecture itself may be configured to allow different privilege levels to use a same address space.

It should be understood that dynamic transformation of the service process is implemented by dynamically changing the privilege level of the service process, so that dynamic transformation of the system architecture is implemented. Therefore, dynamic switching of the system architecture can be implemented.

In an embodiment, the first system architecture includes a first service process, the first service process is pre-divided into a plurality of components, and data access between the plurality of components is not allowed; and the transforming a first system architecture into a second system architecture includes: splitting the first service process into a plurality of sub-service processes based on the plurality of components, where each sub-service process includes one or more of the plurality of components, and different sub-service processes include different components.

That there is no data coupling between the plurality of components obtained by pre-dividing the first service process means that when access is performed between the plurality of components, data access is performed by using a function interface instead of directly accessing a resource or directly accessing a shared variable.

The splitting the first service process into a plurality of sub-service processes based on the plurality of components may be considered as splitting the plurality of components as a whole into a plurality of subsets, where each subset may be isolated as a new service process (that is, a sub-service process obtained by splitting the first service process).

In this embodiment, switching from the first system architecture to the second system architecture is implemented by splitting the first service process into the plurality of sub-service processes. The quantity of service processes in the first system architecture is different from the quantity of service processes in the second system architecture.

It should be understood that dynamic switching of the system architecture is implemented by splitting and transforming the service process.

In an embodiment, the first system architecture includes a second service process and a third service process, and the transforming a first system architecture into a second system architecture includes: combining the second service process and the third service process into a first service process. The first service process is pre-divided into a plurality of components, and there is no data coupling between the plurality of components. In addition, the second service process and the third service process respectively include a part of the plurality of components, and components included in the second service process are different from those included in the third service process.

The combining the second service process and the third service process into a first service process may be considered as combining the components in the second service process and the components in the third service process into the first service process.

In this embodiment, switching from the first system architecture to the second system architecture is implemented by combining the second service process and the third service process into the first service process. The quantity of service processes in the first system architecture is different from the quantity of service processes in the second system architecture.

It should be understood that dynamic switching of the system architecture is implemented by combining and transforming the service processes.

It should also be understood that dynamic transformation of the service processes is implemented by dynamically changing the quantity of service processes, so that dynamic transformation of the system architecture is implemented. Therefore, dynamic switching of the system architecture can be implemented.

In an embodiment, the first system architecture includes a first service process, the first service process is pre-divided into a plurality of components, and there is no data coupling between the plurality of components; and the transforming a first system architecture into a second system architecture includes: splitting the first service process into a plurality of sub-service processes based on the plurality of components, and changing a privilege level of one or more of the plurality of sub-service processes, so that the privilege level of the one or more sub-service processes is different from a privilege level of the first service process, where each sub-service process includes one or more of the plurality of components, and different sub-service processes include different components.

That the privilege level of the one or more sub-service processes is different from a privilege level of the first service process is also a case of a change of the privilege level of the first service process. When addresses at different privilege levels are different, the first service process is created by using a mechanism in which a data segment supports address-independent relocation and a mechanism in which a code segment supports address-independent relocation. For the mechanism in which the data segment supports address-independent relocation and the mechanism in which the code segment supports address-independent relocation, refer to the foregoing description. Details are not described herein again.

In this embodiment, switching from the first system architecture to the second system architecture is implemented by splitting the first service process into the plurality of sub-service processes and changing the privilege level of the one or more of the plurality of sub-service processes. The quantity of service processes in the first system architecture is different from the quantity of service processes in the second system architecture, and privilege levels of the service processes in the first system architecture are also different from privilege levels of the service processes in the second system architecture.

It should be understood that dynamic transformation of the service processes is implemented by dynamically changing the quantity and privilege levels of the service processes, so that dynamic transformation of the system architecture is implemented. Therefore, dynamic switching of the system architecture can be implemented.

In an embodiment, which one or more of the foregoing transformation manners is used for system architecture switching may be determined based on an application scenario.

In this application, when the service process runs, dynamic transformation such as splitting and transformation, combining and transformation, privilege escalation and transformation, or privilege de-escalation and transformation can be performed. In this way, dynamic transformation of the system architecture can be implemented. Therefore, in this application, the system architecture can be adaptively adjusted based on a change of an application scenario, so that requirements of application scenarios on different system architectures can be dynamically met during running.

In addition, in this application, one system architecture can support transformation of different architectures. Therefore, only one set of code needs to be used to implement the system architecture. Therefore, code overheads can be reduced. It should be understood that the system architecture can be adjusted at a relatively fine granularity for an application scenario by using one set of code, without causing a service interruption or causing a service to be offline, so that switching of the system architecture is more flexible and that background noise is less.

In an embodiment, parameter transfer specifications of all communication interfaces in the transformed service process are unified. The communication interfaces include any one or more of the following: a function call communication interface, an inter-privilege-level communication interface, and an inter-process communication interface.

The function call communication interface represents a communication interface corresponding to a function call. The inter-privilege-level communication interface represents a communication interface for communication between privilege levels. The inter-process communication interface represents a communication interface for communication between processes.

The parameter transfer specifications of all the communication interfaces in the transformed service process are represented in a unified manner, parameter transfer specifications of all communication interfaces for performing call requests in the service process are unified, and parameter transfer specifications of all communication interfaces for returning results are also unified. Alternatively, unification of the parameter transfer specifications of all the communication interfaces in the transformed service process may be expressed as unification of the parameter transfer specifications of the communication interfaces for performing call requests and returning results in the service process.

"Unification of the parameter transfer specifications" described herein may also be expressed as "consistency of the parameter transfer specifications".

In an existing solution to implementing a plurality of system architectures in a system, during system architecture switching, an original service is stopped first, and a new service is restarted. From a client perspective, an original service request is interrupted, and a new service request needs to be initiated again. The service is also temporarily interrupted to synchronize a previous state. In other words, in the conventional technology, it is impossible to make the service unaware of switching of a system architecture.

In this application, communication interfaces with unified parameter transfer specifications are set, so that call requests and return results on different communication interfaces (the parameter transfer specifications of different communication interfaces are consistent) are mutually replaceable and that the replacement does not cause a service interruption. In this way, the service can be unaware of dynamic switching of the system architecture.

It should also be understood that designing communication interfaces (for example, the function call communication interface, the inter-privilege-level communication interface, and the inter-process communication interface) with unified parameter transfer specifications can get rid of a problem that communication context synchronization is required after the service process changes (that is, after the system architecture changes). Because no communication context synchronization is required, the service can be unaware of switching.

In addition, during system architecture switching, because no state synchronization is required, additional state copy overheads can be avoided.

In an embodiment in which dynamic switching of the system architecture is implemented by splitting and transforming the service process or combining and transforming the service processes, parameter transfer specifications of all communication interfaces in the first service process and all communication interfaces in each of the plurality of sub-service processes are unified, where the communication interfaces include any one or more of the following: a function call communication interface, an inter-privilege-level communication interface, and an inter-process communication interface.

In an embodiment in which dynamic switching of the system architecture is implemented by changing the privilege level of the service process, parameter transfer specifications of all communication interfaces in the first service process are unified, where the communication interfaces include any one or more of the following: a function call communication interface, an inter-privilege-level communication interface, and an inter-process communication interface.

In an embodiment, parameter transfer specifications of all communication interfaces in the first system architecture and all communication interfaces in the second system architecture are unified, where the communication interfaces include any one or more of the following: a function call communication interface, an inter-privilege-level communication interface, and an inter-process communication interface.

According to a second aspect, a system architecture switching apparatus is provided. The apparatus includes a switching unit and a processing unit. The switching unit is configured to transform a first system architecture into a second system architecture, where the first system architecture represents a system architecture before switching, and the second system architecture represents a system architecture after switching. The processing unit is configured to provide a service for a user by using the second system architecture. A relationship between the first system architecture and the second system architecture is any one or more of the following cases: a privilege level of a service process in the first system architecture is different from a privilege level of a service process in the second system architecture, and a quantity of service processes in the first system architecture is different from a quantity of service processes in the second system architecture.

In an embodiment, the first system architecture includes a first service process; and the switching unit is configured to change a privilege level of the first service process.

In an embodiment, when addresses at different privilege levels are different, the first service process is created by using a mechanism in which a data segment supports address-independent relocation and a mechanism in which a code segment supports address-independent relocation.

In an embodiment, the privilege level of the first service process includes a first privilege level and a second privilege level, where the first privilege level uses a low address, and the second privilege level uses a high address; and the mechanism in which the data segment supports address-independent relocation includes: always mapping the data segment of the first service process to the low address.

In an embodiment, the mechanism in which the data segment supports address-independent relocation includes: performing address translation processing on the data segment of the first service process, so that the data segment of the first service process after the privilege level changes and the data segment of the first service process before the privilege level changes are mapped to a same address; and the mechanism in which the code segment supports address-independent relocation includes: performing address translation processing on the code segment of the first service process, so that the code segment of the first service process after the privilege level changes and the code segment of the first service process before the privilege level changes are mapped to a same address.

In an embodiment in which dynamic switching of the system architecture is implemented by dynamically changing the privilege level of the service process, the system architecture itself may be configured to allow different privilege levels to use a same address space.

In an embodiment, the first system architecture includes a first service process, the first service process is pre-divided into a plurality of components, and there is no data coupling between the plurality of components; and the switching unit is configured to split the first service process into a plurality of sub-service processes based on the plurality of components, where each sub-service process includes one or more of the plurality of components, and different sub-service processes include different components.

In an embodiment, the first system architecture includes a first service process, the first service process is pre-divided into a plurality of components, and there is no data coupling between the plurality of components; and the switching unit is configured to split the first service process into a plurality of sub-service processes based on the plurality of components, and change a privilege level of one or more of the plurality of sub-service processes, so that the privilege level of the one or more sub-service processes is different from a privilege level of the first service process, where each sub-service process includes one or more of the plurality of components, and different sub-service processes include different components.

In an embodiment, the first system architecture includes a first service process; and the switching unit is configured to change a privilege level of the first service process, where parameter transfer specifications of all communication interfaces in the first service process are unified, where the communication interfaces include any one or more of the following: a function call communication interface, an inter-privilege-level communication interface, and an inter-process communication interface.

In an embodiment, the first system architecture includes a first service process, the first service process is pre-divided into a plurality of components, and there is no data coupling between the plurality of components; and the switching unit is configured to split the first service process into a plurality of sub-service processes based on the plurality of components, where each sub-service process includes one or more of the plurality of components, and different sub-service processes include different components. Parameter transfer specifications of all communication interfaces in the first service process and all communication interfaces in each of the plurality of sub-service processes are unified, where the communication interfaces include any one or more of the following: a function call communication interface, an inter-privilege-level communication interface, and an inter-process communication interface.

In an embodiment, parameter transfer specifications of all communication interfaces in the first system architecture and all communication interfaces in the second system architecture are unified, where the communication interfaces include any one or more of the following: a function call communication interface, an inter-privilege-level communication interface, and an inter-process communication interface.

According to a third aspect, a computer system is provided. The computer system includes: a system architecture, where the system architecture may be transformed into a plurality of architectures; and a processor configured to control transformation of the system architecture and provide a service by using an architecture transformed from the system architecture.

In an embodiment, the processor is configured to: transform a first system architecture into a second system architecture, where the first system architecture represents a system architecture before switching, and the second system architecture represents a system architecture after switching; and provide a service for a user by using the second system architecture. A relationship between the first system architecture and the second system architecture is any one or more of the following cases: a privilege level of a service process in the first system architecture is different from a privilege level of a service process in the second system architecture, and a quantity of service processes in the first system architecture is different from a quantity of service processes in the second system architecture.

The processor is configured to perform the method provided in the first aspect. For detailed descriptions, refer to the descriptions in the first aspect. Details are not described herein again.

According to a fourth aspect, a data processing apparatus is provided. The apparatus includes: a memory, configured to store a program; and a processor, configured to execute the program stored in the memory, where when the program stored in the memory is executed, the processor is configured to perform the method in the first aspect.

According to a fifth aspect, a computer-readable medium is provided. The computer-readable medium stores program code for execution by a device, and the program code includes program code used to perform the method in the first aspect.

According to a sixth aspect, a computer program product including instructions is provided. When the computer program product runs on a computer, the computer is enabled to perform the method in the first aspect.

According to a seventh aspect, a chip is provided. The chip includes a processor and a data interface, where the processor reads, by using the data interface, instructions stored in a memory, to perform the method in the first aspect.

In an embodiment, the chip may further include the memory. The memory stores the instructions, and the processor is configured to execute the instructions stored in the memory. When the instructions are executed, the processor is configured to perform the method in the first aspect.

Based on the foregoing descriptions, it can be learned that dynamic switching of a system architecture is implemented by using a transformable system architecture, so that switching of different architectures can be implemented by using only one system architecture. Therefore, only code for implementing the system architecture is required, and code overheads can be reduced in comparison with a conventional technology.

In addition, communication interfaces with unified parameter transfer specifications are set, so that call requests and return results on different communication interfaces (the parameter transfer specifications of different communication interfaces are consistent) are mutually replaceable and that the replacement does not cause a service interruption. In this way, the service can be unaware of dynamic switching of the system architecture.

BRIEF DESCRIPTION OF DRAWINGS

FIG. 1 is a schematic diagram of a high-security system architecture;

FIG. 2 is a schematic diagram of a high-performance system architecture;

FIG. 3 is a schematic flowchart of a system architecture switching method according to an embodiment of this application;

DESCRIPTION OF EMBODIMENTS

Figure 4:
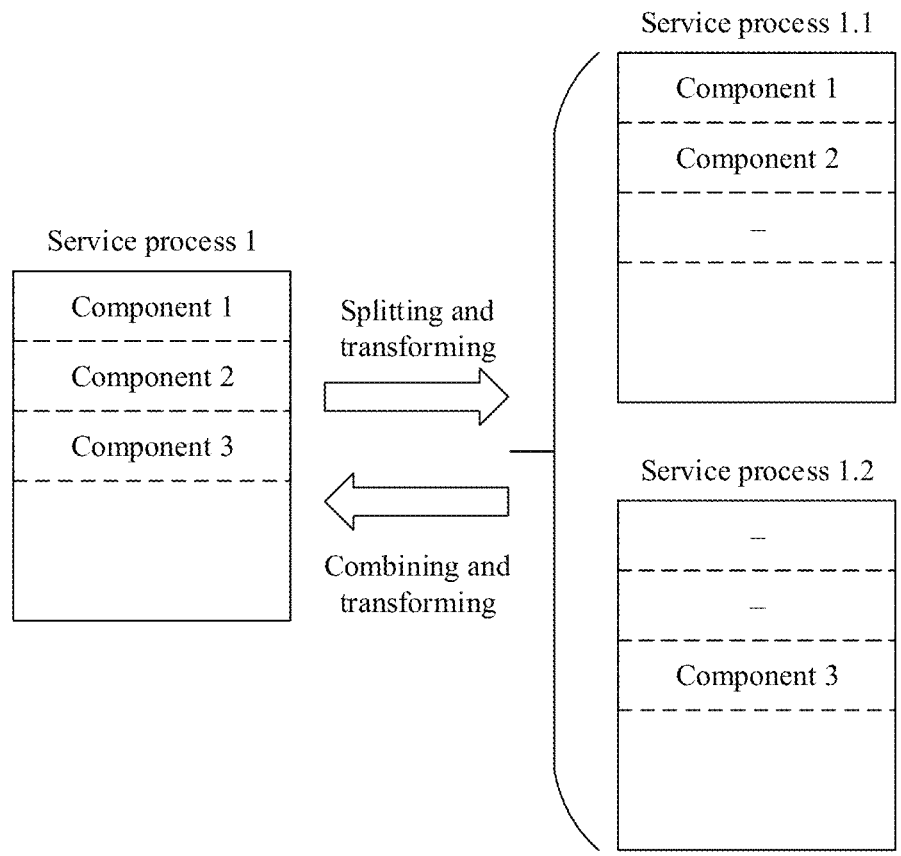
FIG. 4 is a schematic diagram for implementing system architecture switching by splitting and transforming a service process or combining and transforming service processes according to an embodiment of this application.

Different application scenarios have different requirements on security and communication performance of a computer system (hereinafter referred to as the system). For example, in a scenario in which the system interacts with a user, an abnormal input or attack needs to be prevented, that is, the application scenario has a relatively high requirement on security of the computer system. After the interaction between the system and the user is completed, a large amount of computation needs to be performed, that is, the application scenario has a relatively high requirement on communication efficiency.

To meet a requirement on high security, a system architecture needs to ensure error isolation at a relatively fine granularity, so that when an abnormality occurs, a behavior of an abnormal service process does not affect other service processes, or the system architecture needs to ensure that the service process runs with a low privilege. To meet a requirement on high communication performance, the system architecture needs to ensure a coupling between service processes, or allow a service process to run with a high privilege, to improve communication efficiency and/or reduce communication overheads. Therefore, different system architectures need to be designed to meet different application requirements.

In a conventional technology, a system architecture is usually static. To be specific, after the system architecture is determined, the system architecture does not change during system running. For example, the system architecture is fixedly a high-security system architecture shown in FIG. 1, or the system architecture is fixedly a high-performance system architecture shown in FIG. 2.

FIG. 1 is a schematic diagram of a high-security system architecture. In FIG. 1, solid line parts each have independent address spaces that are isolated from each other. The high-security system architecture includes a microkernel, a memory, a driver, a file system (FS), a system service, other services, and an application (APP). The microkernel runs with a high privilege. The memory, the driver, the file system, the system service, the other services, and the APP run with low privileges. The memory, the file system, the system service, and the other services may all be service processes. Because a service process runs with a low privilege, system security can be ensured. In the system architecture shown in FIG. 1, the memory, the file system, the system service, and the other services have independent address spaces that are isolated from each other. To be specific, in the system architecture shown in FIG. 1, service processes are isolated (or referred to as "decoupled") from each other. When an abnormality occurs, a behavior of an abnormal service process does not affect other service processes. Therefore, system security can be ensured. However, a communication mode between the isolated service processes is inter-process communication (IPC). This increases communication overheads and reduces communication performance.

FIG. 2 is a schematic diagram of a high-performance system architecture. In FIG. 2, solid line parts each have independent address spaces that are isolated from each other. The system architecture includes a microkernel, a memory, a file system, a system service, other services, and an APP. The microkernel, the memory, the file system, the system service, and the other services run with high privileges. The APP runs with a low privilege. The memory, the file system, the system service, and the other services may all be service processes. A service process runs with a high privilege, so that the service process can directly access some hardware registers. This can reduce communication overheads. In the system architecture shown in FIG. 2, the memory, the file system, the system service, and the other services are located in a same address space. In other words, in the system architecture shown in FIG. 2, the service processes are coupled. This can improve communication performance. However, because the service processes are coupled, when a behavior error occurs in a service process, other service processes coupled to the service process are affected. Consequently, a system crash is caused, and security and resilience are reduced.

A fixed system architecture can meet a single application scenario. However, as application scenarios become complex and changeable, a problem that the fixed system architecture cannot meet changes in the application scenarios may occur.

For example, when a system interacts with a user (denoted as an application scenario 1), an abnormal input or attack needs to be prevented. Therefore, interacting service processes need to be decoupled or isolated. After the interaction is completed, data of a service process needs to be used to perform a large amount of computation (denoted as an application scenario 2). In this case, efficiency of communication with the service process needs to be improved as much as possible. If the system architecture is fixedly the high-security system architecture shown in FIG. 1, the system architecture can meet a requirement of the application scenario 1, but cannot meet a requirement of the application scenario 2. If the system architecture is fixedly the high-performance system architecture shown in FIG. 2, the system architecture can meet the requirement of the application scenario 2, but cannot meet the requirement of the application scenario 1.

To meet the requirements of complex and changeable application scenarios on the system architecture, a solution to implementing a plurality of system architectures in a system is provided. In an embodiment, a plurality of system architectures are designed in a computer system, and a required system architecture is enabled based on an application scenario. However, to implement one more system architecture, twice as much code is needed, and code overheads are relatively high. This is unacceptable in a scenario with insufficient resources, such as the Internet of Things (IOT).

This application provides a system architecture switching solution, to implement dynamic switching of a system architecture by using a transformable system architecture, so that switching of different architectures can be implemented by using only one system architecture. Therefore, only code for implementing the system architecture is required, and code overheads can be reduced in comparison with a conventional technology.

For better understanding the embodiments of this application, some terms related to the embodiments of this application are first described.

1. Process

A core of a computer is a central processing unit (CPU). The CPU undertakes all computing tasks. An operating system is a manager of the computer, and is responsible for scheduling tasks, allocating and managing, and commanding all computer hardware. An application program (APP) is a program with a function, and the program runs in the operating system.

A process is a dynamic execution process of a program with an independent function on a data set. The process is an independent unit for the operating system to allocate resources and schedule resources. The process is a carrier for running of the application program.

The process has the following features:

Dynamic: The process is an execution process of a program, and is temporary. The process has a life cycle, featuring dynamic generation and dynamic extinction.

Concurrency: Any process can be concurrently performed with other processes.

Independence: The process is an independent unit for allocating and scheduling resources by the system.

Structure: The process includes three parts: the program, data, and a process control block.

2. Process Context

As described in the foregoing process concept description, the process runs dynamically. A process context is a static description of the dynamic running process at a moment. For example, the static description at the moment includes all CPU states related to the process at the moment, for example, generally including states of a general register and a status register (saved program status register, SPSR) of the process at the moment. The SPSR represents a register or a program status register that saves a program status (including a privilege level) in an ARM. In other words, if the dynamic running process is suspended, the process context is all the CPU states related to the process at the moment.

When the process context is restored, the CPU may resume the process from the suspended state.

3. Service

In the conventional technology, one process corresponds to one service.

The process corresponding to the service may be referred to as a service process. It should be understood that the service process is different from a process corresponding to an application program (APP).

The embodiments of this application relate to a process corresponding to a service. Therefore, the process is denoted as a "service process" herein. In other words, the service process mentioned in the embodiments of this application represents the process corresponding to the service.

4. Component

A component mentioned in the embodiments of this application represents a processing unit with a minimum granularity in a process. The component is a set of code and data.

In some embodiments of this application, one service process may be divided into a plurality of components, some components in the plurality of components may form one new service process, and remaining components may form another new service process. In other words, dividing a service process into a plurality of components can transform (split) the service process into a plurality of new service processes. Conversely, a plurality of service processes obtained through splitting can also be reversely transformed (combined) into an original service process. In other words, splitting and combining of components in a service process are reversible.

It is assumed that a service process 1 is divided into a component 1.1, a component 1.2, a component 1.3, and a component 1.4. A transformation process is that the component 1.1 and the component 1.2 form a service process 1.1, and that the component 1.3 and the component 1.4 form a service process 1.2, that is, the service process 1 is split into the service process 1.1 and the service process 1.2. A reverse transformation process is that the components 1.1, 1.2, 1.3, and 1.4 may be combined again into the service process 1, that is, the service process 1.1 and the service process 1.2 are combined into the service process 1. For details, refer to the description of the following embodiment 1.

It should be understood that the service is a logical concept and that the service process and the component are physical concepts.

5. Privilege Level, High Privilege, and Low Privilege

A privilege represents a capability to perform security-related functions on a computer. A process with the privilege to perform security-related functions is considered as running with a high privilege. A process without the privilege to perform security-related functions is considered as running with a low privilege. The high privilege and the low privilege are different privilege levels.

In different operating systems, classification and definitions of privilege levels are different, and meanings of the high privilege and the low privilege are different.

For example, in an ARM system, a privilege level includes a user mode (exception level 0, EL0) and a kernel mode (exception level 1, EL1), or a trusted execution environment (TEE) and a rich execution environment (REE).

For another example, in an x86 system, a privilege level includes a user mode permission (ring 3) and a privilege mode permission (ring 0); and in an Intel system, a privilege level may be further divided into a root mode and a non-root mode.

For another example, a privilege level in an AMD system may include a guest mode and a host mode.

It should be noted that, for an operating system, definitions and specifications of privilege levels, high privileges, and low privileges belong to the conventional technology. Details are not described herein.

Commands for inter-privilege-level communication vary depending on different operating systems. For example, a command for inter-privilege-level communication in the ARM system may be an SVC (supervisor call), an HVC (hypervisor call), or an SMC (secure monitor call); and a command for inter-privilege-level communication in the x86 system is an INT 80 instruction or a system call (syscall) instruction.

The SVC is a communication mode between a user mode (EL0) and a kernel mode (EL1) in an ARM architecture, for example, a communication mode for a system call. The HVC is a communication mode between EL0, EL1, and EL2 in the ARM architecture. The SMC is a communication mode between EL0, EL1, and EL3 in the ARM architecture. EL represents a permission level restriction in the ARM architecture, where EL0 represents the user mode, and EL1, EL2, and EL3 represent restrictions on different permissions in the kernel mode.

6. Inter-Process Communication (Inter-Process Call, IPC)

Inter-process communication represents a mode of transmitting or exchanging messages between different processes in a computer system.

Because of address space isolation between processes, a kernel needs to provide an implementation of inter-process communication.

A communication interface for communication between processes may be referred to as an inter-process communication interface (which may be referred to as an IPC interface for short).

7. Inter-Privilege-Level Communication

Inter-privilege-level communication represents communication between a high privilege and a low privilege.

A communication interface for communication between privilege levels may be referred to as an inter-privilege-level communication interface.

8. Function Call

A function call indicates that a function is used to complete a related command during computer compilation or running.

A communication interface corresponding to the function call may be referred to as a function call communication interface.

The following describes technical solutions of this application with reference to the accompanying drawings.

FIG. 3 is a schematic flowchart of a system architecture switching method according to an embodiment of this application. For example, the method is performed by a processor. The method includes operation S310 and operation S320.

S310. Transform a first system architecture into a second system architecture, where the first system architecture represents a system architecture before switching, and the second system architecture represents a system architecture after switching.

The first system architecture and the second system architecture may be transformed into each other. A relationship between the first system architecture and the second system architecture is any one or more of the following cases: a privilege level of a service process in the first system architecture is different from a privilege level of a service process in the second system architecture, and a quantity of service processes in the first system architecture is different from a quantity of service processes in the second system architecture.

If a current system architecture is the first system architecture, when switching from the first system architecture to the second system architecture is required, the first system architecture is transformed into the second system architecture. In this way, switching from the first system architecture to the second system architecture is implemented. In this case, the first system architecture represents the system architecture before switching, and the second system architecture represents the system architecture after switching.

It should be understood that if the current system architecture is the second system architecture, when switching from the second system architecture to the first system architecture is required, the second system architecture is transformed into the first system architecture. In this way, switching from the second system architecture to the first system architecture is implemented. In this case, the second system architecture represents the system architecture before switching, and the first system architecture represents the system architecture after switching.

Herein, an example in which the first system architecture is transformed into the second system architecture is used for description.

Transforming the first system architecture into the second system architecture means that the second system architecture is obtained through transformation based on the first system architecture. The first system architecture and the second system architecture may be considered as different variations of a same system architecture.

It should be understood that, in this embodiment of this application, only one system architecture needs to be implemented, and the system architecture may support a plurality of variations.

It should be noted that, in this embodiment of this application, one system architecture may support a plurality of variations, for example, two or more variations. For ease of description and understanding, in this embodiment of this application, the first system architecture and the second system architecture, as two variations, are used as examples for description.

It should also be noted that, naming of the first system architecture and the second system architecture is only used to distinguish between system architectures before and after switching, and there is no special limitation. For example, the first system architecture represents a high-security system architecture, and the second system architecture represents a high-performance system architecture, or vice versa. In an actual application, a switching mode of the system architecture may be determined based on an application requirement.

S320. Provide a service for a user by using the second system architecture.

"Providing a service for a user" mentioned herein may also be described as providing a service for an application program (APP).

It should be understood that before switching of the system architecture, a service process (denoted as a service process 1) in the first system architecture provides a service, and after switching of the system architecture, a service process (denoted as a service process 2) in the second system architecture provides a service. The service provided by the service process 1 and the service provided by the service process 2 correspond to a same logical service. For example, before switching of the system architecture, the service process 1 provides a service for an APP 1, and after switching of the system architecture, the service process 2 provides a service for the APP 1. The service process 1 and the service process 2 mentioned herein may be transformed to each other. Details are described later.

In this embodiment, dynamic switching of a system architecture is implemented by using a transformable system architecture, so that switching of different architectures can be implemented by using only one system architecture. Therefore, only code for implementing the system architecture is required, and code overheads can be reduced in comparison with a conventional technology.

It should be understood that, compared with the conventional technology, this embodiment of this application cannot only implement dynamic switching of the system architecture, but also reduce code overheads.

In an embodiment, in operation S310, whether the system architecture needs to be switched may be determined based on an application scenario, and when system switching is required, the system architecture can be transformed.

For example, if the current system architecture is the first system architecture, and it is determined, based on an application scenario, that switching from the first system architecture to the second system architecture is required, the first system architecture is transformed into the second system architecture.

For example, it is assumed that the first system architecture (that is, the current system architecture) represents a high-security system architecture and that the second system architecture represents a high-performance system architecture. If the current application scenario has a relatively high requirement on communication efficiency of the system, the system architecture needs to be switched currently, that is, the first system architecture is transformed into the second system architecture. It should be understood that if the current application scenario has a relatively high requirement on system security, the system architecture does not need to be switched in this case.

It should be understood that in this application, requirements of application scenarios on different system architectures can be dynamically met during system running.

The second system architecture is a variation of the first system architecture, that is, the second system architecture is different from the first system architecture. A difference between the second system architecture and the first system architecture may include any one or more of the following cases: a quantity of service processes is different, and privilege levels of service processes are different.

The first system architecture may be transformed into the second system architecture in a plurality of manners. For example, the transformation may include any one or more of the following: splitting a service process or combining service processes, and changing a privilege level of a service process (privilege escalation or privilege de-escalation). In an embodiment, the following describes an embodiment 1, an embodiment 2, and an embodiment 3.

Embodiment 1: Splitting and Transforming a Service Process or Combining and Transforming Service Processes In some embodiments, the first system architecture includes a first service process, the first service process is pre-divided into a plurality of components, and there is no data coupling between the plurality of components; and operation S310 includes: splitting the first service process into a plurality of sub-service processes based on the plurality of components, where each sub-service process includes one or more of the plurality of components, and different sub-service processes include different components.

That there is no data coupling between the plurality of components obtained by pre-dividing the first service process means that when a access is performed between the plurality of components, data access is performed by using a function interface instead of directly accessing a resource or directly accessing a shared variable.

The splitting the first service process into a plurality of sub-service processes based on the plurality of components may be considered as splitting the plurality of components as a whole into a plurality of subsets, where each subset may be isolated as a new service process (that is, a sub-service process obtained by splitting the first service process).

It should be noted that, for distinguishing rather than limitation, a plurality of service processes obtained by splitting the first service process are denoted as a plurality of sub-service processes.

For example, as shown in FIG. 4, the service process 1 is pre-divided into three components: a component 1, a component 2, and a component 3, and there is no data coupling between the component 1, the component 2, and the component 3. The component 1 and the component 2 may form a new service process: a service process 1.1. The component 3 may form a new service process: a service process 1.2. Addresses of different processes are different, that is, processes are isolated from each other. Therefore, it may be considered that the component 1 and the component 2 are isolated as the service process 1.1 and that the component 3 is isolated as the service process 1.2. As shown in FIG. 4, the service process 1 may be split and transformed into the service process 1.1 and the service process 1.2. The transformation from the service process 1 to the service process 1.1 and the service process 1.2 is reversible, that is, the service process 1.1 and the service process 1.2 can also be reversely transformed into the service process 1. As shown in FIG. 4, the service process 1.1 and the service process 1.2 may be combined and transformed into the service process 1.

The service process 1 in FIG. 4 may correspond to the first service process, and the service process 1.1 and the service process 1.2 in FIG. 4 may correspond to the plurality of sub-service processes obtained by splitting by the first service process.

It should be understood that an increase of the quantity of service processes inevitably leads to a change of the system architecture.

In this embodiment, the system architecture when the first service process is not split and transformed is considered as the first system architecture, and the system architecture after the first service process is split and transformed is considered as the second system architecture. In other words, switching of the system architecture (switching from the first system architecture to the second system architecture) is implemented by splitting and transforming the service process.

In this embodiment, switching from the first system architecture to the second system architecture is implemented by splitting the first service process into the plurality of sub-service processes. The quantity of service processes in the first system architecture is different from the quantity of service processes in the second system architecture.

It should be understood that dynamic switching of the system architecture is implemented by splitting and transforming the service process.

As described above, transformation between service processes is reversible, that is, the transformation may be splitting and transformation or combining and transformation.

In some embodiments, the first system architecture includes a second service process and a third service process, and operation S310 includes: combining the second service process and the third service process into a first service process, to transform the first system architecture into the second system architecture. The first service process is pre-divided into a plurality of components, and there is no data coupling between the plurality of components. In addition, the second service process and the third service process respectively include a part of the plurality of components, and components included in the second service process are different from those included in the third service process.

The combining the second service process and the third service process into a first service process may be considered as combining the components in the second service process and the components in the third service process into the first service process.

With continued reference to FIG. 4, the service process 1.1 in FIG. 4 may correspond to the second service process, the service process 1.2 in FIG. 4 may correspond to the third service process, and the service process 1 in FIG. 4 may correspond to the first service process. In other words, the second service process and the third service process are combined and transformed into the first service process.

It should be understood that a decrease of the quantity of service processes inevitably leads to a change of the system architecture.

In this embodiment, the system architecture when the second service process and the third service process are not combined and transformed is considered as the first system architecture, and the system architecture after the second service process and the third service process are combined and transformed is considered as the second system architecture. In other words, switching of the system architecture (switching from the first system architecture to the second system architecture) is implemented by combining and transforming the service processes.

In this embodiment, switching from the first system architecture to the second system architecture is implemented by combining the second service process and the third service process into the first service process. The quantity of service processes in the first system architecture is different from the quantity of service processes in the second system architecture.

It should be understood that dynamic switching of the system architecture is implemented by combining and transforming the service processes.

Therefore, in this embodiment of this application, dynamic transformation of the service processes is implemented by dynamically changing the quantity of service processes, so that dynamic transformation of the system architecture is implemented. Therefore, dynamic switching of the system architecture can be implemented.

It should also be understood that one service process is pre-divided into a plurality of components without data coupling to each other, and based on the plurality of components, the service process may be split and transformed or service processes may be combined and transformed. This provides a possibility that one system architecture can be transformed into a high-security system architecture or transformed into a high-performance system architecture.

Embodiment 2: Changing a Privilege Level of a Service Process (Privilege Escalation and Transformation or Privilege De-Escalation and Transformation)

In some embodiments, the first system architecture includes a first service process; and operation S310 includes: changing a privilege level of the first service process.

The changing a privilege level of the first service process includes privilege escalation processing and privilege de-escalation processing. The privilege escalation processing means escalating the privilege level of the service process. The privilege de-escalation processing means de-escalating the privilege level of the service process.

Assuming that an initial privilege level of the first service process is a low privilege, when the system architecture needs to be switched, the privilege level of the first service process may be changed to a high privilege. This transformation of the first service process may be referred to as privilege escalation and transformation.

Assuming that an initial privilege level of the first service process is a high privilege, when the system architecture needs to be switched, the privilege level of the first service process may be changed to a low privilege. This transformation of the first service process may be referred to as privilege de-escalation and transformation.

Figure 5:
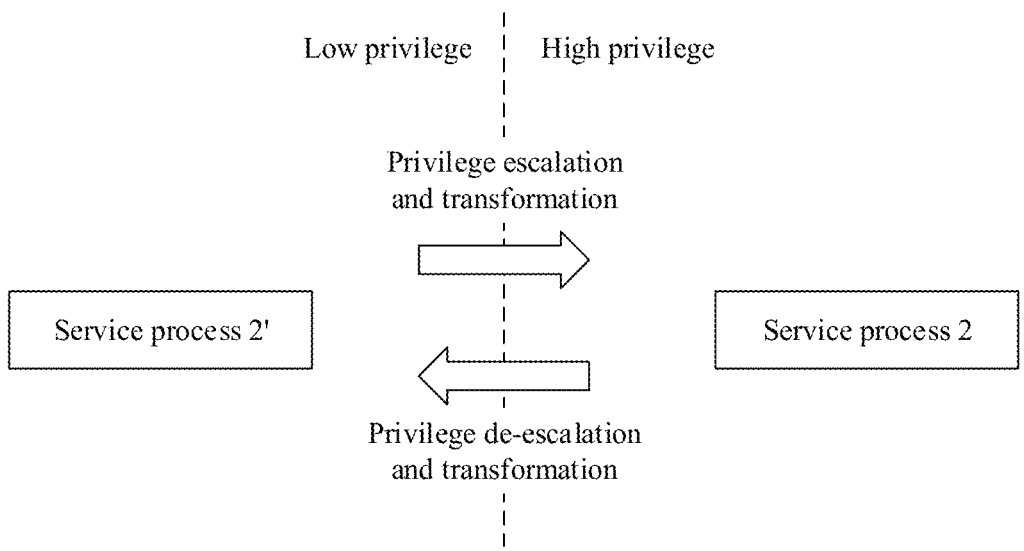
FIG. 5 is a schematic diagram for implementing system architecture switching by changing a privilege level of a service process according to an embodiment of this application.

For example, as shown in FIG. 5, in FIG. 5, for distinguishing rather than limitation, a service process 2 with a high privilege is denoted as a service process 2, and a service process 2 with a low privilege is denoted as a service process 2'. As shown in FIG. 5, privilege escalation and transformation may be performed on the service process 2 to change a privilege level of the service process 2 from the low privilege to the high privilege. Alternatively, privilege de-escalation and transformation may be performed on the service process 2 to change a privilege level of the service process 2 from the high privilege to the low privilege.

It should be understood that a change of the privilege level of the service process inevitably leads to a change of the system architecture.

In this embodiment, the system architecture when the privilege level of the first service process is not changed is considered as the first system architecture, and the system architecture after the privilege level of the first service process is changed is considered as the second system architecture. In other words, switching of the system architecture (switching from the first system architecture to the second system architecture) is implemented by privilege escalation and transformation or privilege de-escalation and transformation of the service process.

In the embodiment 2, switching from the first system architecture to the second system architecture is implemented by changing the privilege level of the first service process. The privilege level of the first service process in the first system architecture is different from a privilege level of a first service process in the second system architecture.

In this embodiment, dynamic switching of the system architecture is implemented by changing the privilege level of the service process.

In some system architectures, addresses at different privilege levels are different. In this case, a change (privilege de-escalation and transformation or privilege escalation and transformation) of a privilege level of a service process causes addresses (including a code address and a data address) of the service process to change. Therefore, there is a problem of reloading and redirection of the service process. For example, in an ARM architecture, a kernel mode (EL1) runs at a high address, and a user mode (EL0) runs at a low address. When the privilege level of the service process is de-escalated from the kernel mode to the user mode, an address of the service process is changed, that is, changed from the high address to the low address.

The high address and low address are common concepts in the computer field. The high address is relative to the low address, that is, relative to a size of address code. Details are not described herein.

In an embodiment relating to the change of the privilege level of the service process (for example, the embodiment 2 or the embodiment 3 described above), when addresses at different privilege levels are different, the first service process is created by using a mechanism in which a data segment supports address-independent relocation and a mechanism in which a code segment supports address-independent relocation.

The mechanism in which the code segment supports address-independent relocation means that running of the service process can be ensured regardless of whether an address of the code segment of the service process changes. In other words, the service process runs independently of the address of the code segment.

The mechanism in which the data segment supports address-independent relocation means that running of the service process can be ensured regardless of whether an address of the data segment of the service process changes. In other words, the service process runs independently of the address of the data segment.

For example, based on the system architecture, the service process may be created by using an appropriate mechanism supporting position-independent relocation.

In an embodiment, the privilege level of the first service process includes a first privilege level and a second privilege level, where the first privilege level uses a low address, and the second privilege level uses a high address; and the mechanism in which the data segment supports address-independent relocation includes: always mapping the data segment of the first service process to the low address.

In an embodiment, one of the first privilege level and the second privilege level represents a low privilege, and the other represents a high privilege.

In an embodiment, both the first privilege level and the second privilege level are high privileges, and a privilege level of one of them is higher than a privilege level of the other.

The operation of always mapping the data segment of the first service process to the low address includes: static configuration and dynamic maintenance. The static configuration means that before the first service process runs, the data segment of the first service process is mapped to the low address by using the static configuration. The dynamic maintenance means that when the privilege level of the first service process changes (that is, a data segment address change is caused) in the running process, the mapping of the data segment still to the low address is dynamically maintained.

Figure 6:
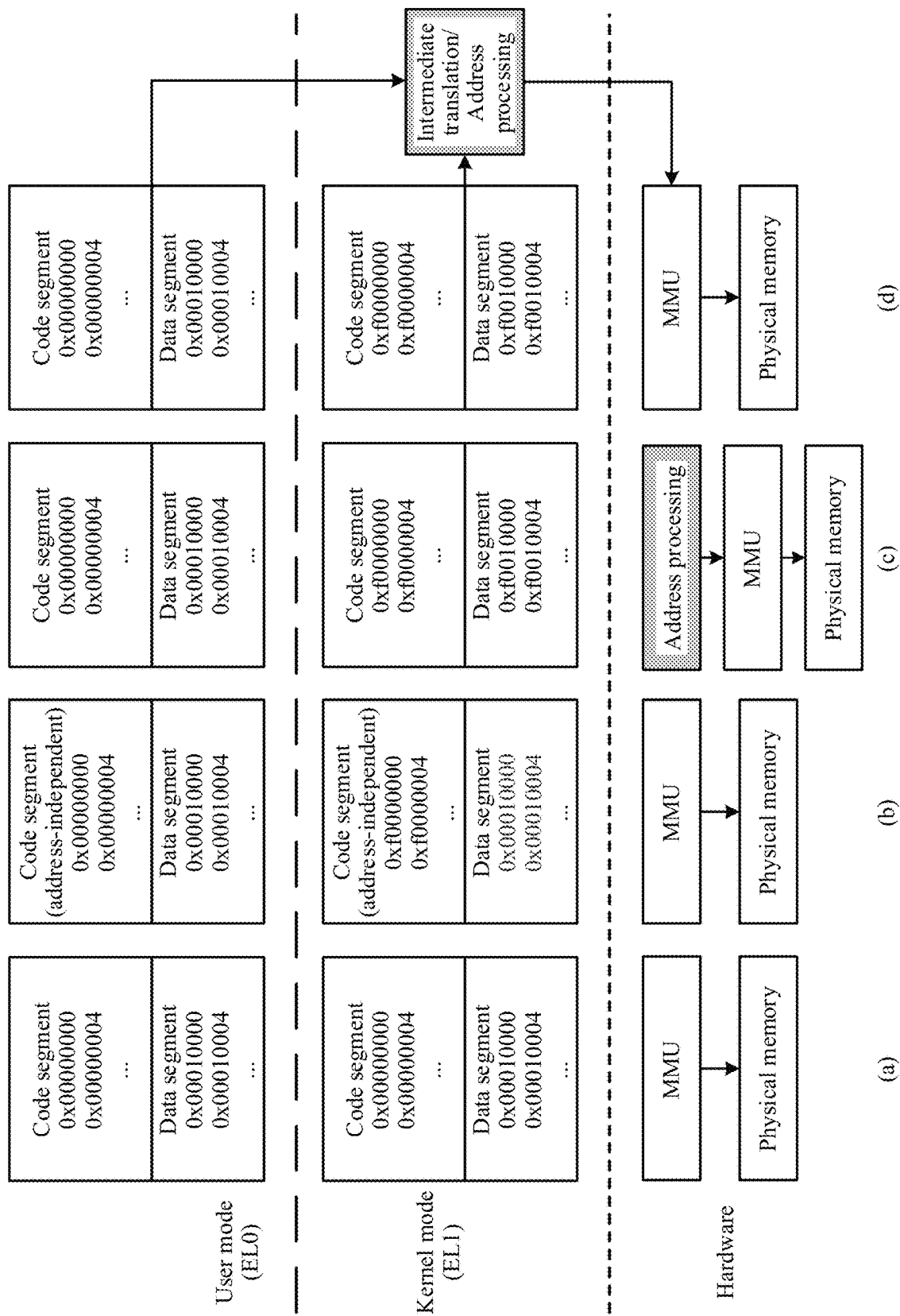
FIG. 6 is a schematic diagram of a mechanism in which address-independent relocation is supported according to an embodiment of this application.

For example, as shown in (b) in FIG. 6, an MMU is configured, so that EL0 uses a page table 0 with a low address and EL1 uses a page table 1 with a high address. For a code segment, an address-independent code segment is generated by using a technique similar to a position independent executable (position independent executable, PIE) program. A data segment is always mapped to the page table 0 with the low address. In the ARM architecture, when the service process runs, code in the page table 1 with the high address can directly access data in the page table 0 with the low address, but conversely, access is denied. By using this advantage, in this embodiment of this application, by maintaining the data segment at the low address and setting the code segment as address-independent, dynamic privilege de-escalation and privilege escalation can be performed on the service process during running, without affecting program execution.

In other words, in the method shown in (b) in FIG. 6, when an address-independent executable file is generated by using a PIE technique, the data segment is always mapped to the low address. When the process runs at different privilege levels EL1/EL0, only the address of the code segment changes and the data segment is always mapped to the low address.

Therefore, by using the method shown in (b) in FIG. 6, it can be ensured that changing the privilege level of the process when the process runs does not affect access to the code and data.

In an embodiment, the mechanism in which the data segment supports address-independent relocation includes: performing address translation processing on the data segment of the first service process, so that the data segment of the first service process after the privilege level changes and the data segment of the first service process before the privilege level changes are mapped to a same address; and the mechanism in which the code segment supports address-independent relocation includes: performing address translation processing on the code segment of the first service process, so that the code segment of the first service process after the privilege level changes and the code segment of the first service process before the privilege level changes are mapped to a same address.

The address translation processing may be performed on the code segment and the data segment of the first service process by using hardware or software.

An example is shown in (c) and (d) in FIG. 6.

As shown in (c) in FIG. 6, when a low address is used with a low privilege and a high address is used with a high privilege, an address processing module (an address processing block shown in (c) in FIG. 6) is introduced in the hardware. Therefore, after being processed by the address processing module, a code segment at the high address can be mapped to a same physical page as a code segment at the low address, and after being processed by the address processing module, a data segment at the high address can be mapped to a same physical page as a data segment at the low address. In this way, when the first service process runs, the change of the address of the first service process does not affect the hardware.

Therefore, by using the method shown in (c) in FIG. 6, it can be ensured that changing the privilege level of the process when the process runs does not affect access to the code and data.

It should be understood that the method shown in (c) in FIG. 6 is to perform address translation processing on the code segment and the data segment of the first service process by using the hardware.

As shown in (d) in FIG. 6, software-level translation (corresponding to intermediate translation in "intermediate translation or address processing" shown in (d) in FIG. 6) is performed on code and data, so that when the service process runs at different privilege levels, addresses of the code segment and the address segment are translated at a software level and processed as a correct high address and low address, and then the translated addresses are used to access the MMU of the hardware.

For example, a technique for performing software-level translation on the code and data includes but is not limited to: using a shadow page table of a virtualization technology or a secondary page table, directly implementing a translation table by using software, or another technique.

With continued reference to (d) in FIG. 6, hardware-level translation (corresponding to address processing in "intermediate translation or address processing" shown in (d) in FIG. 6) may also be performed on code and data, so that when the service process runs at different privilege levels, addresses of the code segment and the address segment are translated at a hardware level and processed as a correct high address and low address, and then the translated addresses are used to access the MMU of the hardware.

It should be understood that, in (d) in FIG. 6, if software-level translation is performed on the code and data, the method is to perform address translation processing on the code segment and the data segment of the first service process by using the software; or if a hardware module is used to process addresses of the code and data to translate the addresses, the method is to perform address translation processing on the code segment and the data segment of the first service process by using the hardware.

Therefore, by using the method shown in (d) in FIG. 6, it can be ensured that changing the privilege level of the process when the process runs does not affect access to the code and data.

In the conventional technology, a manner of changing a privilege level of a process is: first destroying an old process, and then revalidating a new process. In other words, in the conventional technology, a privilege level of a service process cannot be changed during running of the service process.

In this application, because the service process is created by using the mechanism in which the data segment supports address-independent relocation and the mechanism in which the code segment supports address-independent relocation, the privilege level of the service process can be dynamically changed during running of the service process, and dynamic switching of the system architecture can be implemented by dynamically changing the privilege level of the service process.

In an embodiment in which dynamic switching of the system architecture is implemented by dynamically changing the privilege level of the service process, the system architecture itself may be configured to allow different privilege levels to use a same address space.

The mechanism supporting address-independent relocation includes: performing system configuration, so that the system architecture itself allows different privilege levels to use a same address space.

As shown in (a) in FIG. 6, the memory management unit (memory management unit, MMU) is configured, so that both the user mode (EL0) and the kernel mode (EL1) use a same page table and a same base address register. In this solution, no special processing needs to be performed in binary compilation, and changing a privilege level of a process does not cause abnormal impact.

Therefore, by using the method shown in (a) in FIG. 6, it can be ensured that changing the privilege level of the process when the process runs does not affect access to the code and data.

It should be understood that, in the solution shown in (a) in FIG. 6, both the user mode (EL0) and the kernel mode (EL1) use the same page table and the same base address register, and this solution may sacrifice a security feature provided by the hardware.

It should be understood that any one of the four methods shown in (a), (b), (c), and (d) in FIG. 6 may be used to create the first service process. In this way; the privilege level of the first service process can be dynamically changed during running of the first service process.

By using the mechanism supporting address-independent relocation, the privilege level of the service process can be adjusted during running, that is, the system architecture can be switched by adjusting the privilege level of the service process.

Therefore, in this embodiment, dynamic transformation of the service process is implemented by dynamically changing the privilege level of the service process, so that dynamic transformation of the system architecture is implemented. Therefore, dynamic switching of the system architecture can be implemented. For example, based on a change of an application scenario, privilege escalation processing or privilege de-escalation processing is performed on the process when the process runs.

Embodiment 3: Combination of the Embodiment 1 and the Embodiment 2

In some embodiments, the first system architecture includes a first service process, the first service process is pre-divided into a plurality of components, and there is no data coupling between the plurality of components; and step S310 includes: splitting the first service process into a plurality of sub-service processes based on the plurality of components, and changing a privilege level of one or more of the plurality of sub-service processes, so that the privilege level of the one or more sub-service processes is different from a privilege level of the first service process, where each sub-service process includes one or more of the plurality of components, and different sub-service processes include different components.

Figure 7:
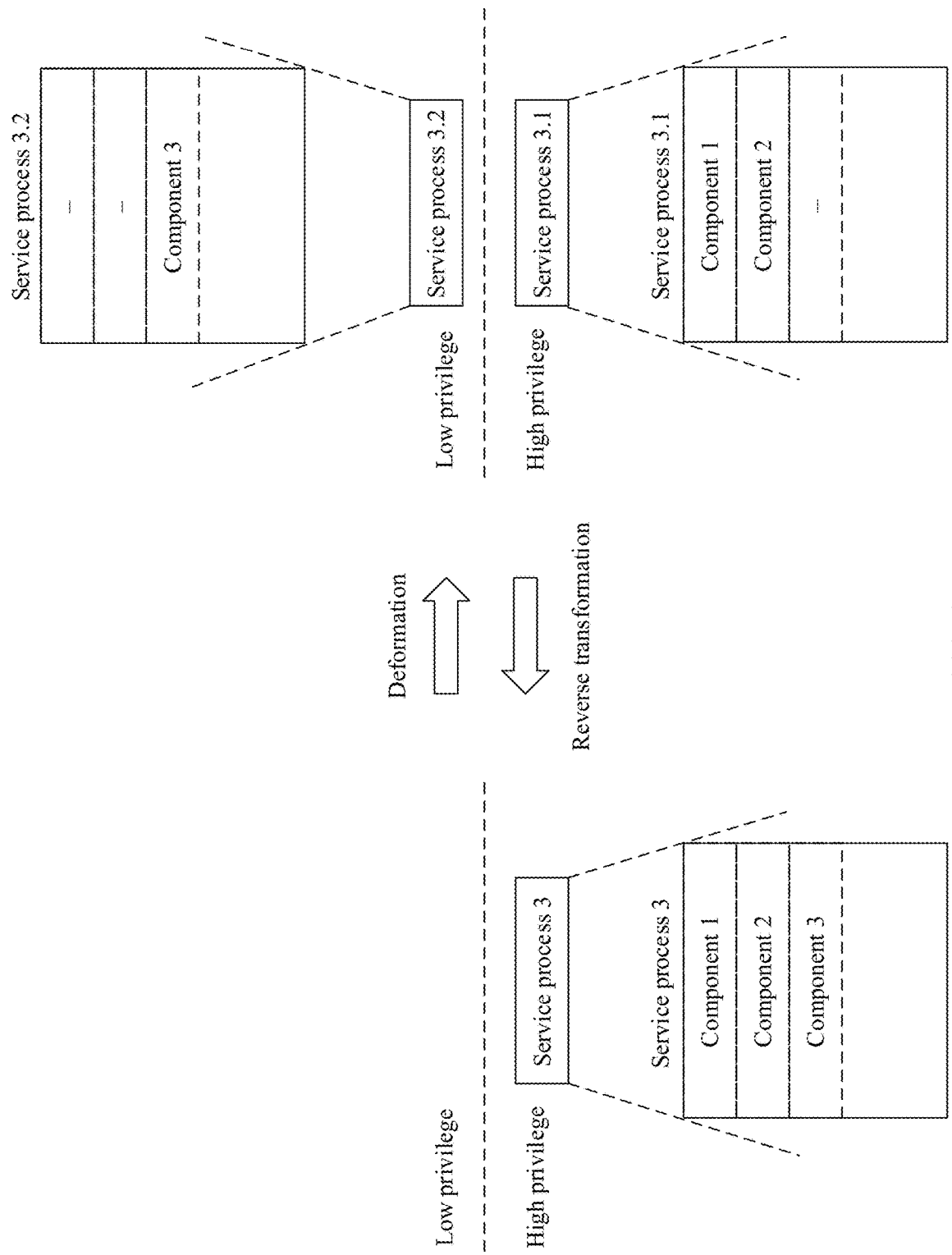
FIG. 7 is a schematic diagram for implementing system architecture switching by splitting and transforming a service process, or combining and transforming service processes, and changing a privilege level of a service process according to an embodiment of this application.

For example, as shown in FIG. 7, a service process 3 is pre-divided into three components: a component 1, a component 2, and a component 3, and there is no data coupling between the component 1, the component 2, and the component 3. A privilege level of the service process 3 is a high privilege. As shown in FIG. 7, the service process 3 may be transformed into a service process 3.1 and a service process 3.2, where a privilege level of the service process 3.1 is a high privilege, and a privilege level of the service process 3.2 is a low privilege. The service process 3.1 is formed by the component 1 and the component 2. The service process 3.2 is formed by the component 3. Addresses of different processes are different, that is, processes are isolated from each other. Therefore, it may be considered that the component 1 and the component 2 are isolated as the service process 3.1 and that the component 3 is isolated as the service process 3.2. It may be understood that, for the service process 3.2, not only splitting and transformation are performed, but also privilege de-escalation and transformation are performed. In other words, in the example in FIG. 7, the transformation of the service process includes not only a change of the quantity of service processes, but also the change of the privilege level.

In FIG. 7, the transformation from the service process 3 to the service process 3.1 and the service process 3.2 is reversible, that is, the service process 3.1 and the service process 3.2 can also be transformed into the service process 3. The reverse transformation process includes combining and transformation and privilege escalation and transformation of the service processes.

It should be understood that the reverse transformation mentioned herein is a relative concept. For example, in FIG. 7, the transformation of the service process 3.1 and the service process 3.2 may be considered as forward transformation, and correspondingly, the transformation from the service process 3 to the service process 3.1 and the service process 3.2 may be considered as reverse transformation.

It should also be understood that changes of the quantity of service processes and the privilege level inevitably lead to a change of the system architecture.

In the embodiment 3, that the privilege level of the one or more sub-service processes obtained by splitting the first service process is different from the privilege level of the first service process also belongs to a case in which the privilege level of the first service process changes. When addresses at different privilege levels are different, the first service process is created by using a mechanism in which a data segment supports address-independent relocation and a mechanism in which a code segment supports address-independent relocation. For the mechanism in which the data segment supports address-independent relocation and the mechanism in which the code segment supports address-independent relocation, refer to the foregoing related description. Details are not described herein again.

In this embodiment, switching from the first system architecture to the second system architecture is implemented by splitting the first service process into the plurality of sub-service processes and changing the privilege level of the one or more of the plurality of sub-service processes. The quantity of service processes in the first system architecture is different from the quantity of service processes in the second system architecture, and privilege levels of the service processes in the first system architecture are also different from privilege levels of the service processes in the second system architecture.

Therefore, in this embodiment, dynamic transformation of the service processes is implemented by dynamically changing the quantity and privilege levels of the service processes, so that dynamic transformation of the system architecture is implemented. Therefore, dynamic switching of the system architecture can be implemented.

It should be understood that FIG. 4, FIG. 5, and FIG. 7 are merely examples and not used for limitation.

In an actual application, which of the foregoing embodiment 1, embodiment 2, and embodiment 3 is used to switch the system architecture may be determined based on an application scenario.

For example, an application scenario has a relatively high requirement on security of a system architecture, but the current system architecture is a high-performance system architecture. In this case, any one of the following operations may be used to switch the system architecture.

(1) The embodiment 1 is used to split and transform a service process, to ensure error isolation at a finer granularity. For example, when an abnormality occurs, a behavior of a faulty service process does not affect other service processes.

(2) The embodiment 2 is used to perform privilege de-escalation and transformation on a service process, so that the service process runs with a low privilege.

(3) The embodiment 3 is used to perform splitting and transformation and privilege de-escalation and transformation (or one of the two) on a service process.

For another example, an application scenario has a relatively high requirement on communication efficiency of a system architecture, but the current system architecture is a high-security system architecture. In this case, any one of the following operations may be used to switch the system architecture.

(1) The embodiment 1 is used to combine and transform service processes, to implement coupling between the service processes and reduce communication overheads, so that the system achieves better performance.

(2) The embodiment 2 is used to perform privilege escalation and transformation on a service process, so that the service process runs with a high privilege. For example, the service process is enabled to directly access some hardware registers to reduce communication overheads.

(3) The embodiment 3 is used to perform combining and transformation and privilege escalation and transformation (or one of the two) on service processes.

Based on the foregoing description, it can be learned that, in this embodiment of this application, when the service process runs, dynamic transformation such as splitting and transformation, combining and transformation, privilege escalation and transformation, or privilege de-escalation and transformation can be performed. In this way, dynamic transformation of the system architecture can be implemented. Therefore, in this application, the system architecture can be adaptively adjusted based on a change of an application scenario, so that requirements of application scenarios on different system architectures can be dynamically met during running.

In addition, in this embodiment of this application, one system architecture can support transformation of different architectures. Therefore, only one set of code needs to be used to implement the system architecture. Therefore, code overheads can be reduced. It should be understood that the system architecture can be adjusted at a relatively fine granularity for an application scenario by using one set of code, without causing a service interruption or causing a service to be offline, so that switching of the system architecture is more flexible and that background noise is less.

In an existing solution to implementing a plurality of system architectures in a system, during system architecture switching, an original service is stopped first, and a new service is restarted. From a client perspective, an original service request is interrupted, and a new service request needs to be initiated again. The service is also temporarily interrupted to synchronize a previous state. In other words, in the conventional technology, it is impossible to make the service unaware of switching of a system architecture.

To resolve this problem, it is proposed in this embodiment of this application that unified parameter transfer specifications (calling convention) should be set for the communication interfaces. Descriptions are provided hereinafter. In the following descriptions, the parameter transfer specifications are referred to as the parameter transfer specifications. "Unification of the parameter transfer specifications" mentioned herein may also be expressed as "consistency of the parameter transfer specifications".

In some embodiments, parameter transfer specifications of all communication interfaces in the transformed service process are unified. The communication interfaces include any one or more of the following: a function call communication interface, an inter-privilege-level communication interface, and an inter-process communication interface.

The function call communication interface represents a communication interface corresponding to a function call. The inter-privilege-level communication interface represents a communication interface for communication between privilege levels. The inter-process communication interface represents a communication interface for communication between processes.

The parameter transfer specifications of all the communication interfaces in the transformed service process are represented in a unified manner, parameter transfer specifications of all communication interfaces for performing call requests in the service process are unified, and parameter transfer specifications of all communication interfaces for returning results are also unified. Alternatively, unification of the parameter transfer specifications of all the communication interfaces in the transformed service process may be expressed as unification of the parameter transfer specifications of the communication interfaces for performing call requests and returning results in the service process.

Communication interfaces with unified parameter transfer specifications are set, so that call requests and return results on different communication interfaces (the parameter transfer specifications of different communication interfaces are consistent) are mutually replaceable and that the replacement does not cause a service interruption. In this way, the service can be unaware of dynamic switching of the system architecture. Descriptions are provided hereinafter with reference to FIG. 8.

Figure 8:
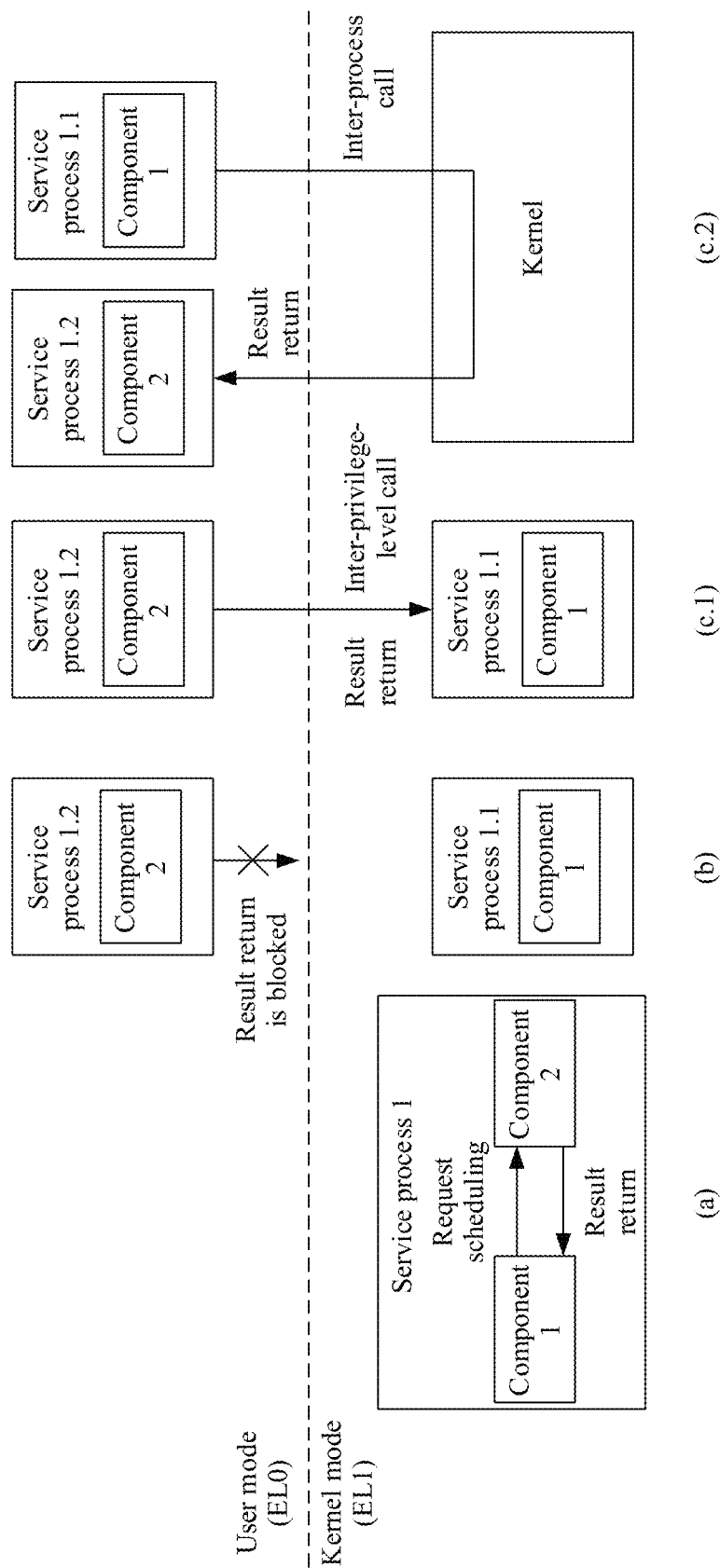
FIG. 8 is a schematic diagram in which communication interfaces with unified parameter transfer specifications are set according to an embodiment of this application.

As shown in (a) in FIG. 8, when the service process 1 is in the kernel mode (Kernel mode, such as EL1 in FIG. 8), the component 1 and the component 2 in the service process 1 communicate with each other by using a function call. For example, the component 1 schedules a request to the component 2 in a function call mode, and the component 2 returns a result to the component 1 in a function call mode. After the function call is initiated, parameter transfer is performed according to ARM function call standard (ARM procedure call standard, APCS) specifications, and a callee starts to perform calculation based on call information.

For example, when the system architecture is adjusted, as shown in (b) in FIG. 8, the service process 1 is split into the service process 1.1 and the service process 1.2, where the service process 1.1 is formed by the component 1, the service process 1.2 is formed by the component 2, and a privilege of the service process 1.2 (which may be considered, for example, as the component 2 in the service process 1) is de-escalated to the user mode (EL0). When the service process 1.2 needs to return a result after completing calculation, the return result cannot be directly returned to the component 1 by using a function call ("result return is blocked", as shown in (b) in FIG. 8).

If unified parameter transfer specifications are set for the inter-process call communication interface, the inter-privilege-level call communication interface, and the function call communication interface (or referred to as unification of the parameter transfer specifications), the return result of the service process 1.2 may be returned to the service process 1.1 in an inter-privilege-level call form, as shown in (c.1) in FIG. 8.

For another example, when the system architecture is adjusted, as shown in (c.2) in FIG. 8, the service process 1 is split into the service process 1.1 and the service process 1.2, where the service process 1.1 is formed by the component 1, the service process 1.2 is formed by the component 2, and privileges of the service process 1.1 (which may be considered, for example, as the component 1 part in the service process 1) and the service process 1.2 (which may be considered, for example, as the component 2 part in the service process 1) are both de-escalated to the user mode (EL0). In the conventional technology, if the system architecture is dynamically switched as shown in (c.2) in FIG. 8, after the service process 1.2 completes calculation, a result cannot be directly returned to the component 1 by using a function call. However, if unified parameter transfer specifications are set for the inter-process call communication interface, the inter-privilege-level call communication interface, and the function call communication interface (or referred to as unification of the parameter transfer specifications), the return result of the service process 1.2 may be returned to the service process 1.1 in an inter-process call (IPC) form, as shown in (c.2) in FIG. 8.

As can be learned from the foregoing description with reference to FIG. 8, communication interfaces with unified parameter transfer specifications are set, so that call requests and return results on different communication interfaces (the parameter transfer specifications of different communication interfaces are consistent) are mutually replaceable and that the replacement does not cause a service interruption. Therefore, for a service request of an application program (APP), different communication modes may be used to perform call requests and return results. In this way, the service can be unaware of dynamic switching of the system architecture.

It should also be understood that designing communication interfaces (for example, the function call communication interface, the inter-privilege-level communication interface, and the inter-process communication interface) with unified parameter transfer specifications can get rid of a problem that communication context synchronization is required after the service process changes (that is, after the system architecture changes). Because no communication context synchronization is required, the service can be unaware of switching.

For example, a request that has been processed halfway during system architecture switching may continue to be processed after system architecture switching.

In addition, during system architecture switching, because no state synchronization is required, additional state copy overheads can be avoided.

The embodiment in which the parameter transfer specifications of the communication interfaces in the service process are unified may be applied to the foregoing embodiment 1, embodiment 2, and embodiment 3.

In an embodiment, in the foregoing embodiment 1, parameter transfer specifications of all communication interfaces in the first service process and all communication interfaces in each of the plurality of sub-service processes are unified, where the communication interfaces include any one or more of the following: a function call communication interface, an inter-privilege-level communication interface, and an inter-process communication interface.

In this embodiment, the first service process is pre-divided into a plurality of independent components, and parameter transfer specifications of communication interfaces between the components are unified (that is, the components communicate with each other by using the communication interfaces with unified parameter transfer specifications). The plurality of independent components mean that there is no data coupling between the components and that the components do not directly access resources of each other but perform data access by using the communication interfaces.

It should be understood that, in this embodiment, when dynamic switching of the system architecture is implemented by splitting and transforming the service process or combining and transforming the service processes, the service can be unaware of switching.

In an embodiment, in the foregoing embodiment 2, parameter transfer specifications of all communication interfaces in the first service process are unified, where the communication interfaces include any one or more of the following: a function call communication interface, an inter-privilege-level communication interface, and an inter-process communication interface.

It should be understood that, in this embodiment, when dynamic switching of the system architecture is implemented by changing the privilege level of the service process, the service can be unaware of switching.

In an embodiment, in the foregoing embodiment 3, parameter transfer specifications of all communication interfaces in the first service process and all communication interfaces in each of the plurality of service processes are unified, where the communication interfaces include any one or more of the following: a function call communication interface, an inter-privilege-level communication interface, and an inter-process communication interface.

Figure 9:
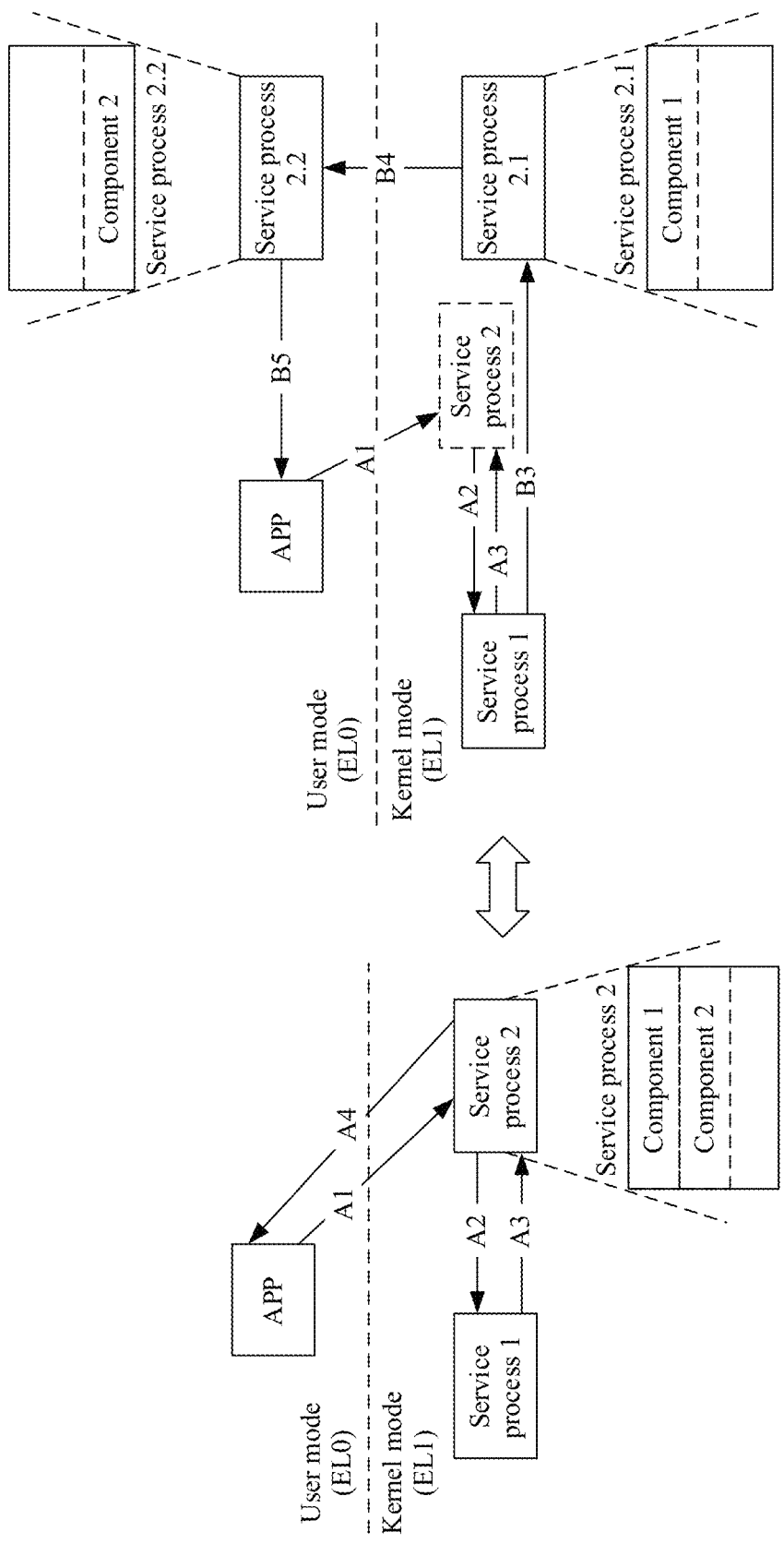
FIG. 9 is a schematic diagram of an example of system architecture switching according to an embodiment of this application.

For example, FIG. 9) shows two mutually transformable system architectures: the first system architecture and the second system architecture. In FIGS. 9, A1, A4, and B4 indicate inter-privilege-level calls; and A2, A3, B3, and B5 indicate inter-process calls. In FIG. 9, it is assumed that an APP requests a service from a service process 2. The service process 2 is pre-divided into a component 1 and a component 2, and there is no data coupling between the component 1 and the component 2. In FIG. 9, parameter transfer specifications of communication interfaces A1, A4, B4, A2, A3, B3, and B5 and a function call communication interface between the component 1 and the component 2 included in the service process 2 before the splitting and transformation are unified.

Refer to the left diagram in FIG. 9. In the first system architecture, the APP requests the service from the service process 2 by using an inter-privilege-level call A1; the service process 2 requests the service process 1 by using an inter-process call A2; and after completing the service requested by the APP, the service process 1 returns a service response result to the service process 2 by using an inter-process call A3, and the service process 2 returns the service response result to the APP by using an inter-privilege-level call A4.

Referring to the left diagram and the right diagram in FIG. 9, it can be learned that the first system architecture is transformed into the second system architecture in the following manner: The service process 2 is split and transformed into a service process 2.1 and a service process 2.2, where the service process 2.1 is formed by the component 1, and the service process 2.2 is formed by the component 2. The service process 2.1 continues to run in the kernel mode (EL1). The service process 2.2 undergoes privilege de-escalation processing and runs in the user mode (EL0).

It is assumed that in the service process 2, the component 2 is responsible for processing the request of the APP. In the first system architecture, after the APP requests the service from the service process 2 by using the inter-privilege-level call A1, the component 2 requests the component 1 by using a function call (not shown in FIG. 9), and the component 1 requests the service process 1 by using the inter-process call A2. It is assumed that, in this case, a dynamic architecture adjustment is performed to transform the first system architecture shown in the left diagram in FIG. 9 into the second system architecture shown in the right diagram in FIG. 9. Because parameter transfer specifications of the function call communication interface (communication interface between the component 1 and the component 2, not shown in FIG. 9), the inter-process call communication interfaces (A2, A3, B3, and B5), and the inter-privilege-level call communication interfaces (A1, A4, and B4) are unified, when the adjustment of the system architecture is completed, the service process 1 can directly return the service response result to the service process 2.1 by using an inter-process call B3, the service process 2.1 returns the service response result to the service process 2.2 by using an inter-privilege-level call B4, and the service process 2.2 can finally return the service response result to the APP by using an inter-process call B5. For the APP, although an embodiment of the communication interface used for the inter-privilege-level call A1 is different from that used for the inter-process call B5 (it should be understood that this is caused by the dynamic adjustment of the system architecture), the APP is unaware of the difference. In other words, the service is unaware of the architecture adjustment of transforming the first system architecture shown in the left diagram in FIG. 9 into the second system architecture shown in the right diagram in FIG. 9.

It can be learned that, in the example in FIG. 9, the component 1 and the component 2 in the service process 2 access each other by using function calls. After the service process 2 is split and transformed into the service process 2.1 and the service process 2.2, a communication mode between the service process 2.1 and the service process 2.2 is an inter-privilege-level call. It may be understood that a communication mode between the component 1 and the component 2 in the service process 2 is switched from a function call to an inter-privilege-level call.

It should be noted that, in the second system architecture, the APP may also directly access the service process 2.2 by using an inter-process call.

In the example shown in FIG. 9, before the system architecture is adjusted, that is, in the first system architecture, the component 1 and the component 2 in the service process 2 run in a same address space in the kernel mode (EL1), and access each other by using function calls. In this case, communication overheads are lowest, and are only time overheads of one function call. After the system architecture is adjusted, that is, in the second system architecture, the communication mode between the component 1 and the component 2 is changed from the function call to inter-privilege-level communication. In this case, communication overheads are slightly increased, but the component 1 and the component 2 are isolated as the service process 2.1 and the service process 2.2 respectively. In addition, a privilege of the service process 2.2 is de-escalated to the user mode. This can effectively improve overall security and resilience of the system.

For example, the first system architecture shown in FIG. 9 may be considered as a high-performance system architecture, and the second system architecture shown in FIG. 9 may be considered as a high-security system architecture.

It can be learned from the example in FIG. 9 that, by setting consistent parameter transfer specifications for the communication interfaces, different communication modes can be used to perform call requests and return results for a same service request, and the service is unaware of this process.

It should be understood that, in this embodiment, when dynamic switching of the system architecture is implemented by splitting and transforming the service process or combining and transforming the service processes, and changing the privilege level, the service can be unaware of switching.

In some embodiments, parameter transfer specifications of all communication interfaces in the first system architecture and all communication interfaces in the second system architecture are unified, where the communication interfaces include any one or more of the following: a function call communication interface, an inter-privilege-level communication interface, and an inter-process communication interface.

Based on the foregoing descriptions, in this embodiment of this application, communication interfaces with unified parameter transfer specifications are set, so that call requests and return results on different communication interfaces (the parameter transfer specifications of different communication interfaces are consistent) are mutually replaceable and that the replacement does not cause a service interruption. In this way, the service can be unaware of dynamic switching of the system architecture.

For example, the system architecture provided in this embodiment of this application may be applied to a resource-limited application scenario such as the IoT.

Figure 10:
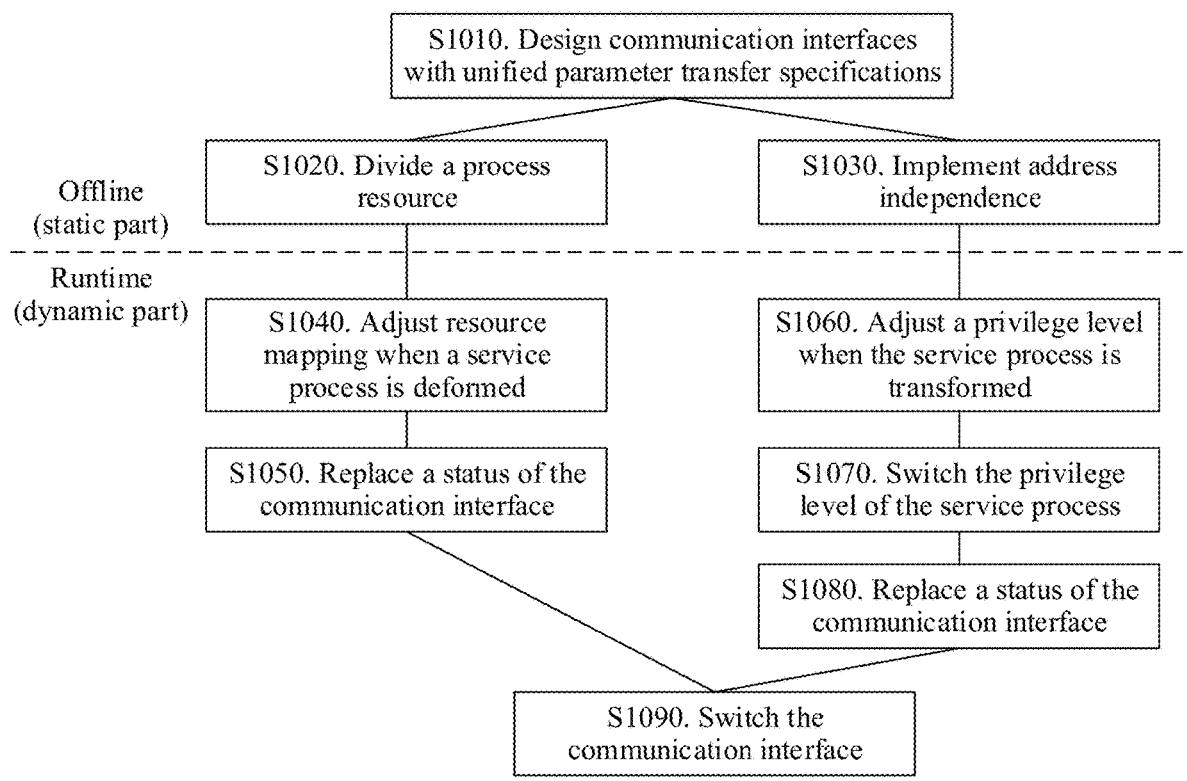
FIG. 10 is another schematic flowchart of a system architecture switching method according to an embodiment of this application.

For better understanding the embodiments of this application, with reference to FIG. 10, the following describes an example in which dynamic switching of a system architecture is implemented in an embodiments of this application. As shown in FIG. 10, a process of implementing dynamic switching of the system architecture may include an offline static part and a runtime dynamic part, where the offline static part is a basis for runtime dynamic switching.

The offline static part includes design and implementation of communication interfaces with unified parameter transfer specifications, division of component resources, and selection and corresponding implementation of an address-independent solution.

The runtime dynamic part mainly includes: adjusting a resource mapping when a service process is split and transformed or combined and transformed, adjusting a privilege level of the service process during privilege de-escalation and transformation or privilege escalation and transformation of the service process, and switching communication interfaces before and after the adjustment.

S1010. Design communication interfaces with unified parameter transfer specifications.

An ARM system is used as an example. Existing function call specifications APCS or AAPCS (procedure call standard for the ARM architecture) of the ARM specify a function parameter transfer sequence and a return sequence, and also specify registers to be restored by a caller (Caller) and a callee (Callee) respectively. The AAPCS is a new function call standard for the ARM architecture and is used for the ARM64.

Similarly, in this embodiment of this application, an inter-privilege-level call and an inter-process call with same parameter transfer specifications are designed.

For example, the design enables parameter transfer specifications of all communication interfaces in the transformed service process to be unified, where the communication interfaces include any one or more of the following: a function call communication interface, an inter-privilege-level communication interface, and an inter-process communication interface.

For another example, the design enables parameter transfer specifications of all function call communication interfaces, privilege level communication interfaces, and inter-process communication interfaces in the system to be unified.

Different interfaces can be used for the caller's call and the callee's return when it is ensured parameter transfer specifications of an inter-process call, an inter-privilege-level call, and a function call are consistent.

For detailed descriptions, refer to the foregoing descriptions with reference to FIG. 8. Details are not described herein again.

S1020. Divide a process resource.

To meet dynamic splitting at a runtime, the process resource needs to be pre-divided into components. There is no data coupling between the components. During calls, data access is performed uniformly through exposed function interfaces (that is, direct access to shared variables is canceled). During compilation, code and data of each component are mapped in a centralized manner.

For example, the resource of the service process 1 in FIG. 4 is statically divided into three components: a component 1, a component 2, and a component 3. The code and data of each component are mapped in a centralized manner.

S1030. Implement address independence.

In some architectures, when a privilege level of a service process changes, relocation and loading are performed, and an address of the service process changes. For example, in the ARM architecture, a kernel mode (EL1) runs at a high address, and a user mode (EL0) runs at a low address. For example, when the privilege level of the service process is de-escalated from the kernel mode to the user mode, the address of the service process changes from a high address to a low address.

To meet the dynamic change of the privilege level of the service process during running, an appropriate address-independent solution should be selected based on the system architecture to compile and generate a corresponding executable file.

For example, any one of the four methods shown in (a), (b), (c), and (d) in FIG. 6 may be used to compile and generate a corresponding executable file. For detailed descriptions, refer to the foregoing descriptions. For brevity, details are not described herein again.

S1050. Replace a status of a communication interface.

Before the splitting and transformation, the service process may be in a state of serving an APP. It is assumed that a serving component in the service process is the component 3 in FIG. 4. After operation S1040 is completed, the component 3 is located in the service process 1.2. Because the service process 1.1 no longer needs to serve the APP, a process context is reinitialized to a wait-for-service state. The service process 1.2 continues to perform service processing based on the process context before the splitting and transformation. After the processing is completed, the service process 1.2 is responsible for returning a result to the user-mode APP.

S1060. Adjust the privilege level when the service process is transformed.

When a kernel determines to perform privilege escalation processing or privilege de-escalation processing on the service process, a status register of the corresponding service process needs to be modified to adjust the corresponding privilege level. Because the process can directly run at EL0 or EL1 after operation S1030, the process can continue to run without being affected after the privilege level of the process is adjusted.

S1070. Switch the privilege level of the service process.

Generally, each privilege level uses its own page table register and context register. Therefore, after the privilege level of the process is modified, a scheduler needs to replace and use context registers and page table registers at corresponding privilege levels when scheduling processes at different privilege levels. For example, when the service process is adjusted from EL1 to EL0, when the scheduler schedules the process next time, a page table and a base address register at EL1 are selected, or when the context is switched, a stack register at the corresponding privilege level is selected.

S1080. Replace a status of a communication interface.

This operation is similar to operation S1050. Before the privilege level is adjusted, the process may be in a state of serving an APP. It is assumed that the process whose privilege level needs to be adjusted is the service process 1.1 in (c.1) and (c.2) in FIG. 8. Before the privilege level is adjusted, the service runs at EL1, and the user-mode APP or other services access the service process 1.1 by using an inter-privilege-level call. In this case, the service process 1.1 is adjusted to EL0, as shown in (c.2) in FIG. 8. Because the original service uses an inter-privilege-level call (for example, a system call), the kernel needs to modify a context status of the service process 1.1 after the adjustment to EL0. After the service process 1.1 completes the service, a return result is transferred to the kernel by using an inter-process call (IPC), and then the return result continues to be returned to the caller APP by using an inter-process call (IPC).

S1090. Switch the communication interface.

After the status of the communication interface is replaced, the system switches a communication interface of a subsequent service based on the adjusted architecture. Communication modes between different privilege levels, between processes, and within processes are shown in FIG. 8. For details, refer to the foregoing descriptions.

It should be noted that FIG. 10 is merely an example.

For example, steps S1030, S1060, S1070, and S1080 in FIG. 10 are optional. For example, dynamic switching of the system architecture is implemented only by splitting and transforming the service process or combining and transforming service processes.

For another example, steps S1020, S1040, and S1050 in FIG. 10 are optional. For example, dynamic switching of the system architecture is implemented only by changing the privilege level of the service process (privilege escalation and transformation or privilege de-escalation and transformation).

In an actual application, a transformable system architecture may be flexibly designed based on an application requirement. Any solution in which dynamic switching of a system architecture is implemented by using a transformable system architecture shall fall within the protection scope of this application.

The embodiments of this application may be applied to architecture adjustments in various computer systems.

An example in which the embodiments of this application are applied to an architecture adjustment of a file system in an RTOSv3 version in a wireless RRU scenario is hereinafter used for description.

The RTOSv3 version in the wireless RRU scenario uses a microkernel architecture. The microkernel provides IPC, interrupt, and basic scheduling functions. Kernel management, process management, the file system, and drivers all run independently in the form of independent processes. Each service process is isolated as an independent process, so that errors between service processes are isolated without affecting other parts of the system. Formal verification has been performed on the microkernel itself. Therefore, stability and security of the microkernel are far higher than those of other service processes. In this way, stable running of the system can be ensured.

Figure 11:
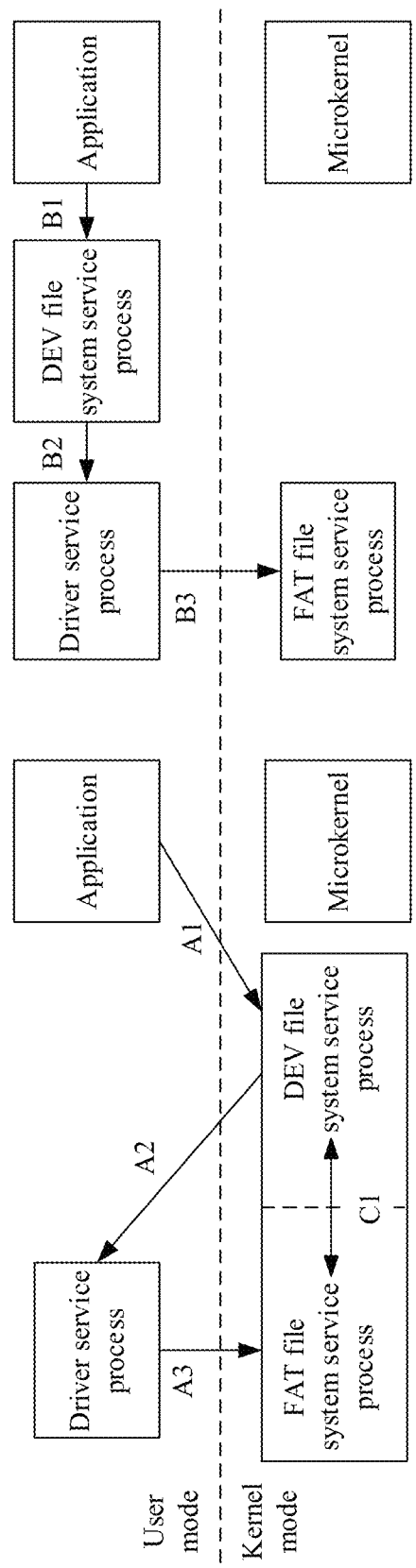
FIG. 11 is a schematic diagram of dynamic architecture switching applied to a file system according to an embodiment of this application.

During service running, a common procedure is that a user-mode application (APP) needs to write a log (Log) or request functions of driver service processes (drivers). A path of the procedure is shown in FIG. 11. The APP sends a file descriptor (fd) to a DEV file system service process (devfs) to request to write a log into the fd; the devfs parses the fd based on its own knowledge and finds the drivers, and calls functions of the drivers. The drivers themselves then call an interface of a FAT file system service process (fatfs) to request to write a file to a flash.

As shown in FIG. 11, the fatfs is a flash (Flash) file system, the devfs is a driver file system (FS), the microkernel is a verified secure and trusted kernel, the drivers are drivers running in the user mode, and the APP is RRU service software.

When the service needs to read and write plenty of logs, to improve efficiency, the system can use a file system coupled system architecture (FS Merged architecture), as shown in the left diagram in FIG. 11. The devfs and fatfs are merged, so that the two can use cache pages in the file system in cooperation, to improve cache utilization. A privilege of the devfs is escalated to the kernel mode, so that the devfs can directly access data of the APP. In the FS merged architecture, an application request direction is inter-privilege-level call A1→inter-privilege-level call A2→inter-privilege-level call A3. In the ARM architecture, inter-privilege-level communication needs to be performed for only three times to complete the process.

When the service does not need to write plenty of files in a centralized manner, the system architecture may be adjusted to a file system decoupled system architecture (FS Split architecture) during running, as shown in the right diagram in FIG. 11. In this scenario, the privilege of the devfs is de-escalated to the user mode, and a call process is inter-process call B1→inter-process call B2→inter-privilege-level call B3. It can be learned that two IPCs and one inter-privilege-level communication are required in the FS split architecture. Overheads of the two IPCs are higher than overheads of the inter-privilege-level communication, and the fatfs and the devfs cannot cooperate by using function calls. Although some performance is sacrificed, the FS split architecture can prevent errors in the devfs from affecting the entire file system. For example, in this scenario, writing error data does not affect correctness of a file in the flash even if an error occurs in the devfs.

In an RTOSv2 version, the kernel is a Linux macro kernel. Table 1 shows results of comparison between a Linux macro kernel architecture and the FS merge architecture and FS split architecture shown in FIG. 11 in terms of system security.

TABLE 1

| Comparison item | (Linux kernel RTOSv2) (Microkernel RTOSv2) | FS split architecture (Microkernel RTOSv3) | FS merge architecture |
|---|---|---|---|
| Drivers error | Impact on the entire system | Impact on only the drivers | Impact on only the drivers |
| Devfs error | Impact on the entire system | Impact on only the devfs | Impact on the entire fs |
| Fatfs error | Impact on the entire system | Impact on only the fatfs | Impact on the entire fs |

Table 1 indicates that the embodiment shown in FIG. 11 uses the FS merge architecture and FS split architecture of the microkernel RTOSv3. This can ensure stability of the kernel. In the solution of the conventional technology (RTOSv2 Linux kernel), because the entire kernel is a macro kernel, and both the drivers and the file system run in the kernel, an error in the drivers or any file system affects the entire system, causing severe consequences such as a system crash and corruption of logs and user data in the file system. The splitting or combining of services may be controlled at a fine granularity in this embodiment. For example, in the FS split architecture, each file system service is isolated, the drivers are also isolated, and privileges of the drivers are de-escalated, so that an error in the file system or a driver has impact on only the file system or the corresponding driver. For another example, in an FS merge architecture, a file system error has impact on the entire file system, but the kernel and drivers are still reliable.

Although the FS merge architecture may cause impact of an error to spread, considering that a service application scenario has a feature that plenty of files need to be read and written only during starting, upgrading, and quitting of the service, and there is no interaction with the user in these scenarios, an error probability can be greatly reduced. Furthermore, considering that the system needs to be upgraded or restarted in this case as soon as possible to reduce a communication service downtime, using the FS merge architecture to improve a processing capacity better meets a requirement of the scenario in this case.

During normal running of the system, read and write requests to the FS are reduced and there are plenty of interactions with the user mode. In this case, the system is more concerned about reliability of the service and security of the system. Therefore, after the system upgrade is completed or startup and initialization are terminated, the architecture can be dynamically adjusted to FS split, to achieve a better error isolation effect.

Results of comparison between the Linux macro kernel architecture and the FS merge architecture and FS split architecture shown in FIG. 11 in terms of read and write performance of the file system are shown in Table 2.

TABLE 2

| Comparison item | (Linux kernel RTOSv2) (Microkernel RTOSv3) | FS split architecture (Microkernel RTOSv3) | FS merge architecture |
|---|---|---|---|
| Synchronously write a 2M file | 72 KB/s | 62 KB/s | 72 KB/s |
| Synchronously read a 2M file | 7478 KB/s | 5433 KB/s | 6367 KB/s |
| Synchronously randomly write a 2M file | 82 KB/s | 66 KB/s | 80 KB/s |
| Synchronously randomly read a 2M file | 6426 KB/s | 2784 KB/s | 3028 KB/s |
| Synchronously write a 128K file | 81 KB/s | 80 KB/s | 105 KB/s |
| Synchronously read a 128K file | 8247 KB/s | 5913 KB/s | 7234 KB/s |

TABLE 2-continued

| Comparison item | (Linux kernel RTOSv2) (Microkernel RTOSv3) | FS split architecture (Microkernel RTOSv3) | FS merge architecture |
|---|---|---|---|
| Synchronously randomly write a 128K file | 78 KB/s | 87 KB/s | 103 KB/s |
| Synchronously randomly read a 128K file | 6402 KB/s | 5522 KB/s | 6468 KB/s |

Table 2 shows the read and write performance of the file system in the current architecture. It can be learned from Table 2 that, after the system architecture is adjusted to the FS merge architecture, overall performance is improved by about 20%. It can also be learned from Table 2 that, in the FS merge architecture, read and write of a small block file is not much different from that of the conventional technology, and write of a large block file is equal to that of the existing solution. This indicates that the FS merge architecture is more suitable for writing a large file (writing plenty of logs) and random reading and writing (log recording by each module). In the solution provided in this embodiment of this application, the system architecture may be adjusted at any time during running to better adapt to a service scenario of a product. For example, security and resilience of the product can be greatly improved while service performance does not deteriorate.

Based on the foregoing descriptions, dynamic switching of a system architecture is implemented by using a transformable system architecture, so that switching of different architectures can be implemented by using only one system architecture. Therefore, only code for implementing the system architecture is required, and code overheads can be reduced in comparison with the conventional technology.

In addition, communication interfaces with unified parameter transfer specifications are set, so that call requests and return results on different communication interfaces (the parameter transfer specifications of different communication interfaces are consistent) are mutually replaceable and that the replacement does not cause a service interruption. In this way, the service can be unaware of dynamic switching of the system architecture.

The embodiments described herein may be independent solutions, or may be combined based on intrinsic logic. These solutions shall all fall within the protection scope of this application.

The foregoing describes the method embodiments provided in this application. The following describes apparatus embodiments provided in this application. It should be understood that descriptions of the apparatus embodiments correspond to the descriptions of the method embodiments. Therefore, for parts not described in detail, refer to the foregoing method embodiments. For brevity, details are not described herein again.

Figure 12:
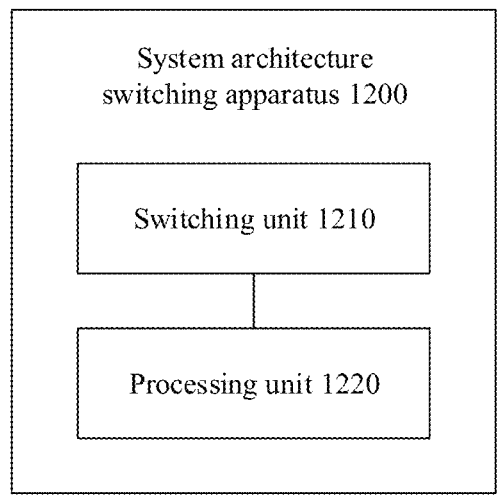
FIG. 12 is a schematic block diagram of a system architecture switching apparatus according to an embodiment of this application.

As shown in FIG. 12, an embodiment of this application provides a system architecture switching apparatus 1200. The apparatus 1200 includes a switching unit 1210 and a processing unit 1220.

The switching unit 1210 is configured to transform a first system architecture into a second system architecture, where the first system architecture represents a system architecture before switching, and the second system architecture represents a system architecture after switching. A relationship between the first system architecture and the second system architecture is any one or more of the following cases: a privilege level of a service process in the first system architecture is different from a privilege level of a service process in the second system architecture, and a quantity of service processes in the first system architecture is different from a quantity of service processes in the second system architecture.

The processing unit 1220 is configured to provide a service for a user by using the second system architecture.

In an embodiment, the first system architecture includes a first service process; and the switching unit 1210 is configured to change a privilege level of the first service process.

In this embodiment, when addresses at different privilege levels are different, the first service process is created by using a mechanism in which a data segment supports address-independent relocation and a mechanism in which a code segment supports address-independent relocation.

In an embodiment, the privilege level of the first service process includes a first privilege level and a second privilege level, where the first privilege level uses a low address, and the second privilege level uses a high address; and the mechanism in which the data segment supports address-independent relocation includes: always mapping the data segment of the first service process to the low address.

In an embodiment, the mechanism in which the data segment supports address-independent relocation includes: performing address translation processing on the data segment of the first service process, so that the data segment of the first service process after the privilege level changes and the data segment of the first service process before the privilege level changes are mapped to a same address; and the mechanism in which the code segment supports address-independent relocation includes: performing address translation processing on the code segment of the first service process, so that the code segment of the first service process after the privilege level changes and the code segment of the first service process before the privilege level changes are mapped to a same address.

In the embodiment in which dynamic switching of the system architecture is implemented by dynamically changing the privilege level of the service process, the system architecture itself may be configured to allow different privilege levels to use a same address space.

In another embodiment, the first system architecture includes a first service process, the first service process is pre-divided into a plurality of components, and there is no data coupling between the plurality of components; and the switching unit 1210 is configured to split the first service process into a plurality of sub-service processes based on the plurality of components, where each sub-service process includes one or more of the plurality of components, and different sub-service processes include different components.

In still another embodiment, the first system architecture includes a first service process, the first service process is pre-divided into a plurality of components, and there is no data coupling between the plurality of components; and the switching unit 1210 is configured to split the first service process into a plurality of sub-service processes based on the plurality of components, and change a privilege level of one or more of the plurality of sub-service processes, so that the privilege level of the one or more sub-service processes is different from a privilege level of the first service process, where each sub-service process includes one or more of the plurality of components, and different sub-service processes include different components.

In still another embodiment, the first system architecture includes a first service process; and the switching unit 1210 is configured to change a privilege level of the first service process, where parameter transfer specifications of all communication interfaces in the first service process are unified, where the communication interfaces include any one or more of the following: a function call communication interface, an inter-privilege-level communication interface, and an inter-process communication interface.

In still another embodiment, the first system architecture includes a first service process, the first service process is pre-divided into a plurality of components, and there is no data coupling between the plurality of components; and the switching unit 1210 is configured to split the first service process into a plurality of sub-service processes based on the plurality of components, where each sub-service process includes one or more of the plurality of components, and different sub-service processes include different components. Parameter transfer specifications of all communication interfaces in the first service process and all communication interfaces in each of the plurality of sub-service processes are unified, where the communication interfaces include any one or more of the following: a function call communication interface, an inter-privilege-level communication interface, and an inter-process communication interface.

In still another embodiment, parameter transfer specifications of all communication interfaces in the first system architecture and all communication interfaces in the second system architecture are unified, where the communication interfaces include any one or more of the following: a function call communication interface, an inter-privilege-level communication interface, and an inter-process communication interface.

For example, the system architecture switching apparatus 1200 provided in this embodiment of this application may be a kernel in a computer system.

Figure 13:
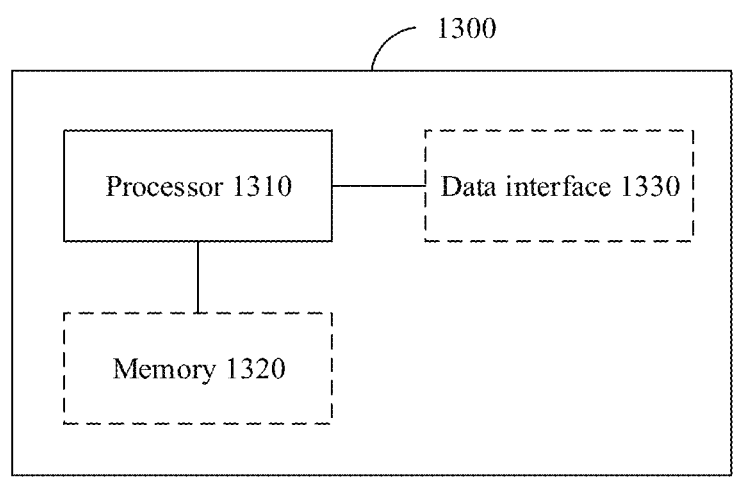
FIG. 13 is another schematic block diagram of a system architecture switching apparatus according to an embodiment of this application.

As shown in FIG. 13, an embodiment of this application further provides a data processing apparatus 1300. The apparatus 1300 includes a processor 1310, where the processor 1310 is coupled to a memory 1320, the memory 1320 is configured to store a computer program or instructions, and the processor 1310 is configured to execute the computer program or instructions stored in the memory 1320, so that the method in the foregoing method embodiment is performed.

In an embodiment, as shown in FIG. 13, the apparatus 1300 may further include the memory 1320.

In an embodiment, as shown in FIG. 13, the apparatus 1300 may further include a data interface 1330, where the data interface 1330 is configured to perform data transmission with an outside world.

Figure 14:
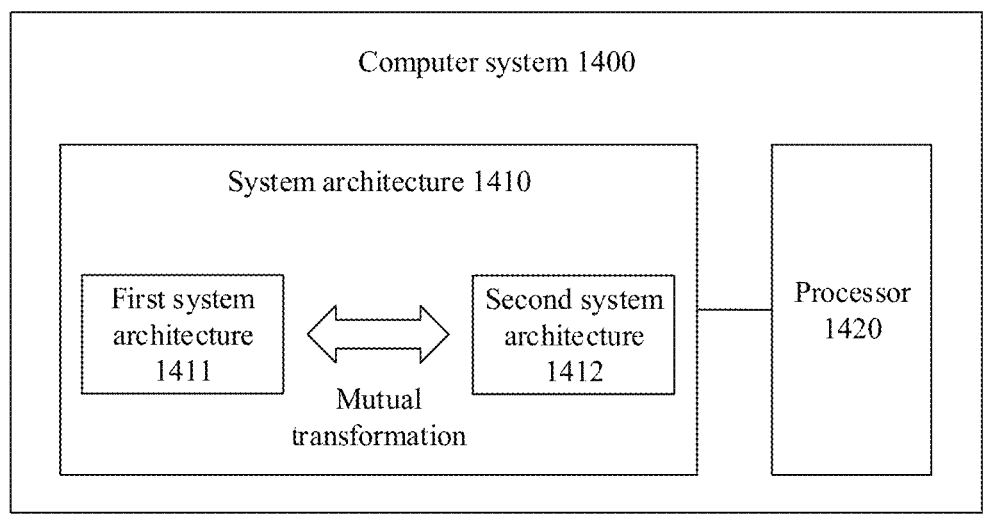
FIG. 14 is a schematic diagram of a computer system according to an embodiment of this application.

As shown in FIG. 14, an embodiment of this application further provides a computer system 1400. The computer system 1400 includes a system architecture 1410 and a processor 1420. The system architecture 1410 may support a plurality of architecture variations. In this embodiment, two variations of the system architecture 1410: a first system architecture 1411 and a second system architecture 1412, are used as examples for description. The first system architecture 1411 and the second system architecture 1412 may be transformed to each other.

The processor 1420 is configured to control transformation of the system architecture 1410 and provide a service by using a transformed architecture of the system architecture 1410.

In an embodiment, the processor 1420 is configured to: transform the first system architecture 1411 into the second system architecture 1412, where the first system architecture 1411 represents a system architecture before switching, and the second system architecture 1412 represents a system architecture after switching; and provide a service for a user by using the second system architecture 1412. A relationship between the first system architecture 1411 and the second system architecture 1412 is any one or more of the following cases: a privilege level of a service process in the first system architecture 1411 is different from a privilege level of a service process in the second system architecture 1412, and a quantity of service processes in the second system architecture 1412 is different from a quantity of service processes in the second system architecture 1412.

In an embodiment, the processor 1420 may transform the first system architecture 1411 into the second system architecture 1412 by using the method 300 in the foregoing method embodiment.

In an embodiment, the first system architecture 1411 includes a first service process, the first service process is pre-divided into a plurality of components, and there is no data coupling between the plurality of components; and the processor 1420 is configured to split the first service process into a plurality of sub-service processes based on the plurality of components, thereby switching from the first system architecture 1411 to the second system architecture 1412, where each sub-service process includes one or more of the plurality of components, and different sub-service processes include different components.

For details, refer to the foregoing description of the embodiment 1. Details are not described herein again.

In another embodiment, the first system architecture 1411 includes a first service process; and the processor 1420 is configured to change a privilege level of the first service process, thereby switching from the first system architecture 1411 to the second system architecture 1412.

For details, refer to the foregoing description of the embodiment 2. Details are not described herein again.

In still another embodiment, the first system architecture 1411 includes a first service process, the first service process is pre-divided into a plurality of components, and there is no data coupling between the plurality of components; and the processor 1420 is configured to split the first service process into a plurality of sub-service processes based on the plurality of components, and change a privilege level of one or more of the plurality of sub-service processes, so that the privilege level of the one or more sub-service processes is different from a privilege level of the first service process, thereby switching from the first system architecture 1411 to the second system architecture 1412, where each sub-service process includes one or more of the plurality of components, and different sub-service processes include different components.

For details, refer to the foregoing description of the embodiment 3. Details are not described herein again.

In an embodiment, parameter transfer specifications of all communication interfaces in the first service process and all communication interfaces in each of the plurality of service processes are unified, where the communication interfaces include any one or more of the following: a function call communication interface, an inter-privilege-level communication interface, and an inter-process communication interface.

In an embodiment, parameter transfer specifications of all communication interfaces in the first system architecture 1411 and all communication interfaces in the second system architecture 1412 are unified, where the communication interfaces include any one or more of the following: a function call communication interface, an inter-privilege-level communication interface, and an inter-process communication interface.

For details, refer to the foregoing related descriptions. Details are not described herein again.

In an embodiment, the processor 1420 may transform the first system architecture 1411 into the second system architecture 1412 by using the method shown in FIG. 10. For detailed descriptions, refer to the foregoing descriptions. Details are not described herein again.

Figure 15:
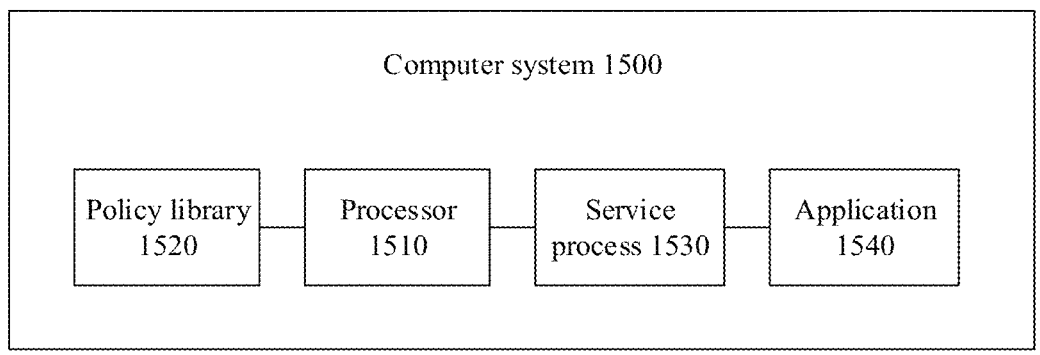
FIG. 15 is another schematic diagram of a computer system according to an embodiment of this application.

As shown in FIG. 15, an embodiment of this application further provides a computer system 1500. The computer system 1500 includes a processor 1510, a policy library 1520, a service process 1530, and an application program (APP) 1540. The service process may be a part of a kernel function, for example, a file system, memory management, a system service, or another service.

The policy library 1520 is configured to store system architecture switching policies.

For example, the system architecture switching policies stored in the policy library 1520 include splitting and transformation, combining and transformation, privilege escalation and transformation, and privilege de-escalation and transformation of the service process that are mentioned in the foregoing embodiments.

The service process 1530 is pre-divided into a plurality of independent components, and there is no data coupling between the plurality of components.

The processor 1510 selects an appropriate system architecture switching policy according to an input and the policies stored by the policy library 1520, and controls transformation of the service process 1530 according to the selected system architecture switching policy, to implement dynamic switching (or referred to as a dynamic adjustment) of the system architecture. The input herein may be a requirement of an application scenario on the system architecture.

The processor 1510 may also be referred to as a kernel.

For example, the processor 1510 is configured to perform the method in the foregoing embodiment, for example, the method shown in FIG. 3 or the method shown in FIG. 10.

In an embodiment, parameter transfer specifications of communication interfaces in the service process 1530 and communication interfaces between the plurality of independent components that are obtained through pre-division in the service process 1530 are unified. For example, the communication interfaces include any one or more of the following: a function call communication interface, an inter-privilege-level communication interface, and an inter-process communication interface.

In an embodiment, parameter transfer specifications of all communication interfaces in the computer system 1500 are unified.

An embodiment of this application further provides a computer-readable medium. The computer-readable medium stores program code for execution by a device, and the program code includes program code used to perform the method in the foregoing embodiment.

An embodiment of this application further provides a computer program product including instructions. When the computer program product runs on a computer, the computer is enabled to perform the method in the foregoing embodiment.

An embodiment of this application further provides a chip. The chip includes a processor and a data interface. By using the data interface, the processor reads instructions stored in a memory; to perform the method in the foregoing embodiment.

In an embodiment, the chip may further include the memory. The memory stores the instructions, and the processor is configured to execute the instructions stored in the memory. When the instructions are executed, the processor is configured to perform the method in the foregoing embodiment.

Unless otherwise defined, all technical and scientific terms used herein shall have the same meanings as commonly understood by a person skilled in the art to which this application belongs. The terms used herein in the specification of this application are only used to describe specific embodiments, and are not intended to limit this application.

It should be noted that various numbers used herein such as "first", "second", "third", and "fourth" are merely intended for distinguishing for ease of description and are not used to limit the scope of the embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the embodiment goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one location, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, a network device, or the like) to perform all or some of the steps of the methods described in embodiments of this application. The storage medium includes any medium that can store program code, such as a universal serial bus flash disk (USB flash disk, UFD) (the UFD may also be referred to as a USB flash drive or a flash drive), a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method of system architecture switching, comprising:
   transforming a first system architecture into a second system architecture, wherein the first system architecture represents a system architecture before system architecture switching, the second system architecture represents a system architecture after the system architecture switching, the first system architecture comprises a first service process pre-divided into a plurality of components, and there is no data coupling between the plurality of components; and
   providing a service for a user by using the second system architecture;
   wherein:
   a relationship between the first system architecture and the second system architecture is one or more of: a privilege level of a service process in the first system architecture is different from a privilege level of a service process in the second system architecture, or a quantity of service processes in the first system architecture is different from a quantity of service processes in the second system architecture;
   transforming the first system architecture into the second system architecture comprises:
     splitting the first service process into a plurality of sub-service processes based on the plurality of components, wherein each sub-service process comprises one or more of the plurality of components, and different sub-service processes comprise different components; or
     splitting the first service process into the plurality of sub-service processes based on the plurality of components, and changing a privilege level of one or more of the plurality of sub-service processes, so that the privilege level of the one or more sub-service processes is different from a privilege level of the first service process, wherein each sub-service process comprises one or more of the plurality of components, and different sub-service processes comprise different components.

2. The method according to claim 1, wherein parameter transfer specifications of communication interfaces in the first service process are unified, and
   the communication interfaces comprise one or more of:
   a function call communication interface, an inter-privilege-level communication interface, or an inter-process communication interface.

3. The method according to claim 1, wherein parameter transfer specifications of communication interfaces in the first service process and communication interfaces in each of the plurality of sub-service processes are unified, and
   the communication interfaces comprise one or more of:
   a function call communication interface, an inter-privilege-level communication interface, or an inter-process communication interface.

4. The method according to claim 1, wherein
   parameter transfer specifications of communication interfaces in the first system architecture and communication interfaces in the second system architecture are unified, and
   the communication interfaces comprise one or more of:
   a function call communication interface, an inter-privilege-level communication interface, or an inter-process communication interface.

5. The method according to claim 1, further comprising:
   when addresses at different privilege levels are different, creating the first service process by using a mechanism in which a data segment supports address-independent relocation and a mechanism in which a code segment supports address-independent relocation.

6. The method according to claim 5, wherein
   the privilege level of the first service process comprises a first privilege level and a second privilege level, the first privilege level uses a low address, and the second privilege level uses a high address; and
   using the mechanism in which the data segment supports the address-independent relocation comprises: mapping the data segment of the first service process to the low address.

7. The method according to claim 5, wherein
   using the mechanism in which the data segment supports the address-independent relocation comprises: performing address translation processing on the data segment of the first service process, so that the data segment of the first service process after the privilege level changes and the data segment of the first service process before the privilege level changes are mapped to a same address; and
   using the mechanism in which the code segment supports the address-independent relocation comprises: performing address translation processing on the code segment of the first service process, so that the code segment of the first service process after the privilege level changes and the code segment of the first service process before the privilege level changes are mapped to a same address.

8. A system architecture switching apparatus, comprising:
   at least one processor; and
   one or more memories coupled to the at least one processor and storing programming instructions, which when executed by the at least one processor, cause the system architecture switching apparatus to:
   transform a first system architecture into a second system architecture, wherein the first system architecture represents a system architecture before system architecture switching, the second system architecture represents a system architecture after the system architecture switching, the first system architecture comprises a first service process pre-divided into a plurality of components, and there is no data coupling between the plurality of components; and provide a service for a user by using the second system architecture;

wherein:

a relationship between the first system architecture and the second system architecture is one or more of: a privilege level of a service process in the first system architecture is different from a privilege level of a service process in the second system architecture, or a quantity of service processes in the first system architecture is different from a quantity of service processes in the second system architecture;

to transform the first system architecture into the second system architecture, the programming instructions, which when executed by the at least one processor, cause the system architecture switching apparatus to:

split the first service process into a plurality of sub-service processes based on the plurality of components, wherein each sub-service process comprises one or more of the plurality of components, and different sub-service processes comprise different components; or split the first service process into the plurality of sub-service processes based on the plurality of components, and change a privilege level of one or more of the plurality of sub-service processes, so that the privilege level of the one or more sub-service processes is different from a privilege level of the first service process, wherein each sub-service process comprises one or more of the plurality of components, and different sub-service processes comprise different components.

9. The system architecture switching apparatus according to claim 8, wherein parameter transfer specifications of communication interfaces in the first service process are unified, and the communication interfaces comprise one or more of:
a function call communication interface, an inter-privilege-level communication interface, or an inter-process communication interface.

10. The system architecture switching apparatus according to claim 8, wherein parameter transfer specifications of communication interfaces in the first service process and communication interfaces in each of the plurality of sub-service processes are unified, and the communication interfaces comprise one or more of:
a function call communication interface, an inter-privilege-level communication interface, or an inter-process communication interface.

11. The system architecture switching apparatus according to claim 8, wherein parameter transfer specifications of communication interfaces in the first system architecture and communication interfaces in the second system architecture are unified, and the communication interfaces comprise any one or more of the following:
a function call communication interface, an inter-privilege-level communication interface, and an inter-process communication interface.

12. The system architecture switching apparatus according to claim 8, wherein the programming instructions, which when executed by the at least one processor, further cause the system architecture switching apparatus to:

when addresses at different privilege levels are different, create the first service process by using a mechanism in which a data segment supports address-independent relocation and a mechanism in which a code segment supports address-independent relocation.

13. The system architecture switching apparatus according to claim 12, wherein the privilege level of the first service process comprises a first privilege level and a second privilege level, the first privilege level uses a low address, and the second privilege level uses a high address; and to use the mechanism in which the data segment supports the address-independent relocation, the programming instructions, which when executed by the at least one processor, cause the system architecture switching apparatus to: map the data segment of the first service process to the low address.

14. The system architecture switching apparatus according to claim 12, wherein to use the mechanism in which the data segment supports the address-independent relocation, the programming instructions, which when executed by the at least one processor, cause the system architecture switching apparatus to: perform address translation processing on the data segment of the first service process, so that the data segment of the first service process after the privilege level changes and the data segment of the first service process before the privilege level changes are mapped to a same address; and to use the mechanism in which the code segment supports the address-independent relocation, the programming instructions, which when executed by the at least one processor, cause the system architecture switching apparatus to: perform address translation processing on the code segment of the first service process, so that the code segment of the first service process after the privilege level changes and the code segment of the first service process before the privilege level changes are mapped to a same address.

* * * * *